United States Patent
Yamazoe et al.

(10) Patent No.: US 10,572,325 B2
(45) Date of Patent: Feb. 25, 2020

(54) POWER STORAGE MANAGEMENT SYSTEM

(71) Applicant: Hitachi, Ltd., Tokyo (JP)

(72) Inventors: Takanori Yamazoe, Tokyo (JP); Mitsutoshi Honda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 316 days.

(21) Appl. No.: 15/524,289

(22) PCT Filed: Nov. 7, 2014

(86) PCT No.: PCT/JP2014/079518
§ 371 (c)(1),
(2) Date: May 4, 2017

(87) PCT Pub. No.: WO2016/072002
PCT Pub. Date: May 12, 2016

(65) Prior Publication Data
US 2017/0351561 A1 Dec. 7, 2017

(51) Int. Cl.
*G06F 11/07* (2006.01)
*H01M 10/48* (2006.01)
(Continued)

(52) U.S. Cl.
CPC ........ *G06F 11/0745* (2013.01); *B60L 3/0046* (2013.01); *B60L 58/21* (2019.02);
(Continued)

(58) Field of Classification Search
CPC ............. G06F 11/0745; G06F 11/0754; G06F 11/0793
See application file for complete search history.

(56) References Cited

U.S. PATENT DOCUMENTS

| 9,191,239 B2* | 11/2015 | Yamaji | H04L 12/6418 |
| 2009/0034421 A1* | 2/2009 | Kodama | H04L 43/50 370/242 |
| 2014/0334375 A1* | 11/2014 | Sugitani | H04W 84/20 370/315 |

FOREIGN PATENT DOCUMENTS

| JP | 2005-135762 A | 5/2005 |
| JP | 2009-105667 A | 5/2009 |

OTHER PUBLICATIONS

International Search Report dated Dec. 16, 2014 as issued in corresponding International Application No. PCT/JP2014/079518.

* cited by examiner

*Primary Examiner* — Jigar P Patel
(74) *Attorney, Agent, or Firm* — Foley & Lardner LLP

(57) ABSTRACT

An object of the invention is to improve communication quality in a power storage management system.
The above-mentioned problem may be solved by the following one solution. When a communication error where transmission, reception, or both transmission and reception of a signal is not allowed occurs between one or a plurality of a plurality of information acquisition devices that acquires states of a plurality of power storage cells and an information collection device that communicates with the plurality of information acquisition devices in a time-division manner, and collects information related to the states of the plurality of power storage cells acquired by the plurality of respective information acquisition devices, a process for resolving a communication error is executed by putting all the plurality of information acquisition devices in a state in which communication with the information collection device is allowed at all times. Here, the plurality of information acquisition devices is in a state in which communication with the information collection device is allowed in a (Continued)

first period in which the plurality of information acquisition devices communicates with the information collection device, and is in a state in which the state, in which communication with the information collection device is allowed, is canceled in a second period in which other information acquisition devices communicate with the information collection device in a relation of n to 1 (n is a positive natural number indicating the number of communication channels of the information collection device).

12 Claims, 18 Drawing Sheets

(51) Int. Cl.
    *H01M 10/42*     (2006.01)
    *H04Q 9/00*     (2006.01)
    *B60L 3/00*     (2019.01)
    *B60L 58/21*     (2019.01)

(52) U.S. Cl.
    CPC ......... *G06F 11/0793* (2013.01); *H01M 10/42* (2013.01); *H01M 10/48* (2013.01); *H04Q 9/00* (2013.01); *B60L 2240/545* (2013.01); *B60L 2240/547* (2013.01); *B60L 2240/549* (2013.01); *H04Q 2209/30* (2013.01); *H04Q 2209/40* (2013.01); *H04Q 2209/883* (2013.01); *Y02T 10/7005* (2013.01); *Y02T 10/7061* (2013.01); *Y02T 90/16* (2013.01)

POWER STORAGE MANAGEMENT SYSTEM

TECHNICAL FIELD

The present invention relates to a power storage management system.

BACKGROUND ART

A power storage management system acquires a state quantity of a power storage cell and collects information related to the acquired state quantity in order to monitor and control a state of the power storage cell. The information related to the state quantity is signal-transmitted from an information acquisition unit to an information collection unit through communication. For example, technologies disclosed in PTL 1 and PTL 2 may be used when information is collected through communication. PTL 1 discloses a communication scheme using radio. Communication by wire is generally used as a communication scheme. PTL 2 discloses a technology for setting communication timing with a subsequent slave unit each time a master unit communicates with a slave unit.

CITATION LIST

Patent Literature

PTL 1: Japanese Unexamined Patent Application Publication No. 2005-135762
PTL 2: Japanese Unexamined Patent Application Publication No. 2009-105667 A

SUMMARY OF INVENTION

Technical Problem

In communication, due to disturbance, for example, an influence of magnetic noise, a communication error may occur such as: a slave unit may not receive a request signal output from a master unit; and the slave unit may not output a response signal to the master unit. In addition, a frequency of occurrence of communication errors may increase depending on adopted communication schemes. For this reason, when a communication error occurs between the master unit and one slave unit, it is preferable to recover from the communication error at an early stage and return to a normal communication state without any problem (normal communication can be resumed) in terms of maintaining and improving communication quality. For example, even when recovering from the communication error, there is a need to avoid a new problem that communication timing between the master unit and another slave unit is shifted by performing a recovery process for the communication error, and thus a communication disabled state or a significant delay in communication occurs between the master unit and the other slave unit. Therefore, even when the communication scheme disclosed in PTL 1 or the communication technology disclosed in PTL 2 is adopted, the above-described problem needs to be prevented.

In this regard, an object of the invention is to improve communication quality in a power storage management system.

Solution to Problem

The above-mentioned problem may be solved by the following one representative solution. When a communication error where transmission, reception, or both transmission and reception of a signal is not allowed occurs between one or a plurality of a plurality of information acquisition devices that acquires states of a plurality of power storage cells and an information collection device that communicates with the plurality of information acquisition devices in a time-division manner, and collects information related to the states of the plurality of power storage cells acquired by the plurality of respective information acquisition devices, a process for resolving a communication error is executed by putting all the plurality of information acquisition devices in a state in which communication with the information collection device is allowed at all times. Here, the plurality of information acquisition devices is in a state in which communication with the information collection device is allowed in a first period in which the plurality of information acquisition devices communicates with the information collection device, and is in a state in which the state, in which communication with the information collection device is allowed, is canceled in a second period in which other information acquisition devices communicate with the information collection device in a relation of n to 1 (n is a positive natural number indicating the number of communication channels of the information collection device).

Advantageous Effects of Invention

According to one representative solution, it is possible to improve communication quality in a power storage management system.

DESCRIPTION OF EMBODIMENTS

Figure 1:
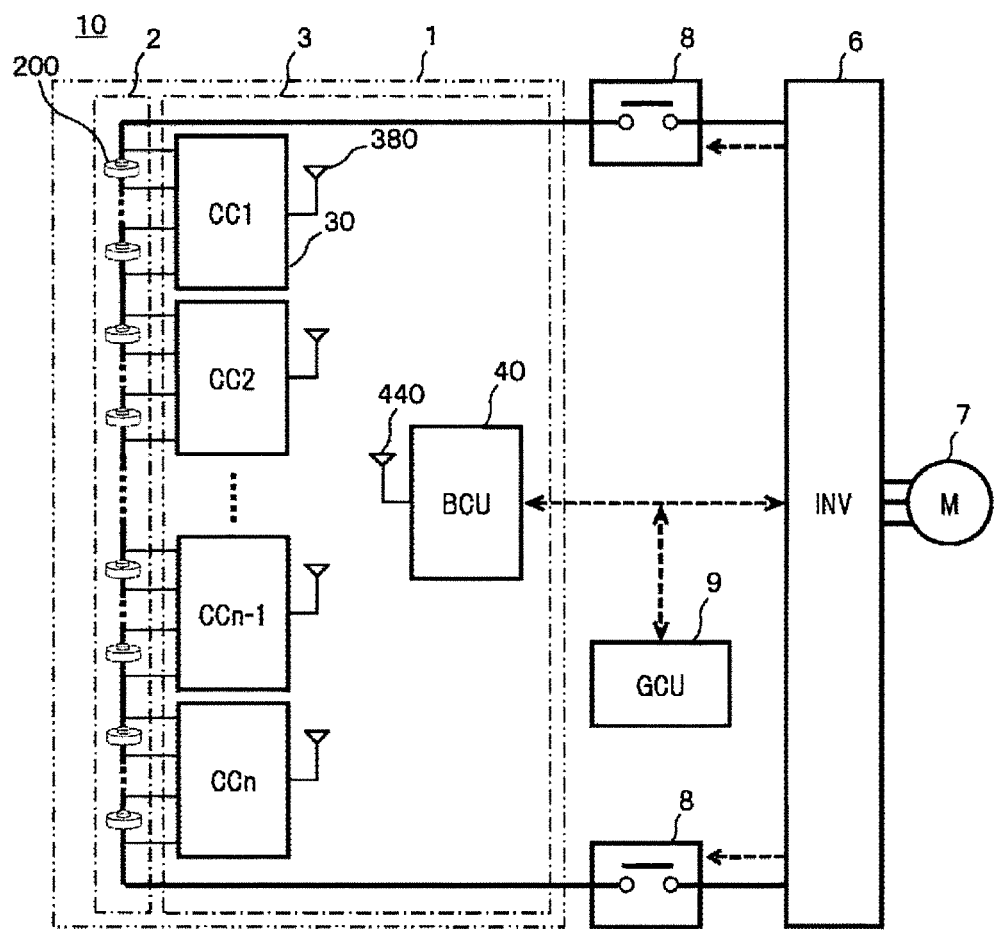
FIG. 1 is a block diagram illustrating an electrical connection configuration between a battery system including a battery management system according to the present embodiment and a load.

A power storage management system, which is one representative invention of the present application, is mounted in a power storage system and acquires and collects a state quantity of a power storage cell that accumulates electric energy to manage a state of the power storage cell. The power storage management system includes, as main components, an information acquisition unit that acquires the state quantity of the power storage cell, and an information collection unit that collects information related to the state quantity of the power storage cell to perform calculation, control, abnormality monitoring, etc. for managing the state of the power storage cell. A signal transmission path by wired communication or wireless communication is formed between the information acquisition unit and the information collection unit, and signals are mutually exchanged via this signal transmission path. In communication, a communication error may occur due to an influence of disturbance. It is important to respond to the communication error to maintain or improve communication quality.

In embodiments below, a battery management system mounted in a battery system corresponding to a power storage system to acquire and collect state quantity of a battery corresponding to a power storage cell, thereby managing a state of the battery is given as an application example of the invention, and a configuration, a method, etc. for maintaining or improving communication quality will be mainly described in detail. There are other problems to be solved. The other problems will be described along with a configuration, a method, etc. for solving the problems by replacing an effect which is an inversion of the problems in the embodiments below.

In addition, in the embodiments below, the battery system is applied to a motor system. Details will be described below with reference to the drawings. An application to which the motor system is applied is not specifically described in the embodiments below. However, one of applications to which the motor system is applied is a drive system of a movable body, specifically, an electric vehicle corresponding to an electrically driven vehicle (a power train that generates a driving force (or a propulsive force) of a vehicle).

Here, there are several types of electric vehicles such as a pure electric vehicle, a hybrid electric vehicle, a plug-in hybrid electric vehicle, etc.

The pure electric vehicle has a motor as an only power source and is driven by power from the motor. Electric energy accumulated in the battery system by charging from a commercial power source or a desk lamp is used as driving power of the motor. When a fuel cell is mounted in a vehicle, electric energy generated by the fuel cell is directly used or temporarily stored and used. The pure electric vehicle may be simply referred to as an electric vehicle. An electric vehicle equipped with the fuel cell may be referred to as a fuel cell vehicle.

The hybrid electric vehicle has both an engine and a motor, which are internal combustion engines, as power sources, and is driven by power from the engine and the motor. Electric energy accumulated in the battery system by power generation using engine power or regenerative power is used as driving power of the motor. Examples of a scheme of using power include a scheme in which power is used by changing a distribution of power of the engine and power of the motor, and a scheme in which the vehicle is driven exclusively by power from the engine and power of the motor is used to assist power of the engine. In a power distribution system, it is possible to selectively use power to perform driving only by power from the engine, driving only by power from the motor, or driving by power from both the engine and the motor.

Similarly to the hybrid electric vehicle, the plug-in hybrid electric vehicle has both an engine and a motor as a power source, and is driven mainly by power from the motor. Electric energy accumulated in the battery system by power generation using engine power or regenerative power and charging from a commercial power source or a desk lamp is used as driving power of the motor. That is, the plug-in hybrid electric vehicle is obtained by adding an external charging function to the hybrid electric vehicle.

Regardless of a type of electric vehicle, the motor system may be applied to a drive system of every electric vehicle.

In addition, there are several types of electric vehicles, such as a common passenger car, a passenger vehicle such as a bus, a freight car such as a delivery truck, a special vehicle such as a garbage truck, etc. Regardless of a type of electric vehicle, the motor system may be applied to a drive system of every electric vehicle.

Furthermore, in addition to the drive system, the electric vehicle uses a motor system in an assistance drive system, etc. The motor system may be applied to another system such as the assistance drive system.

Besides the electric vehicle, examples of the electrically driven vehicle includes a railway vehicle such as a hybrid electric train, an industrial vehicle such as a battery type forklift truck, a vehicle equipped with a construction machine such as a crane, a vehicle engaged in civil engineering work, etc. A motor system for driving a vehicle or for generating power is mounted in these vehicles. The motor system may be applied to systems of these vehicles.

The battery system may be applied to another system other than the motor system. Examples of the other system other than the motor system include an uninterruptible power supply device used in a system such as a computer or a server, a private power generation facility installed in an electric power consumer such as a factory or a hospital, power generating equipment or an electric power system using natural energy such as sunlight, wind power, or subterranean heat, etc. A battery system serving as a backup (emergency) power source or a power fluctuation control power supply is mounted in these systems, and state of the battery is managed by a battery management system similarly to the battery system of the motor system.

An application example of the invention may correspond to a power storage system which is different from the battery system. The battery system includes a battery that stores electric energy by a chemical reaction in an electrode as a power storage cell that stores electric energy by an action of two electrodes of an anode (positive electrode) and a cathode (negative electrode). Examples of the power storage cell include a condenser or a capacitor that does not involve a chemical reaction unlike a battery and stores electrical energy as an electric charge in an electrode. A power storage system using the condenser or the capacity includes a power storage management system for managing a state of the condenser, the capacitor, etc. similarly to the battery system. For this reason, an application example of the invention may correspond to the power storage system including the power storage cell other than the battery such as the condenser or the capacitor. An electric double layer capacitor and a lithium ion capacitor may be used as the condenser or the capacitor.

Furthermore, in the embodiments below, a rechargeable secondary battery, particularly a nonaqueous lithium ion battery is used as the battery used in the battery system. The secondary battery is not restricted to the nonaqueous lithium ion battery, and an aqueous secondary battery such as a nickel hydrogen battery, a lead battery, etc. may be used as the secondary battery.

Hereinafter, a detailed description will be given of a battery management system which is an application example of the invention, a battery system mounted with the battery management system, and a motor system mounted with the battery system with reference to the drawings.

(Embodiment 1)

In recent years, a global environmental problem has been largely highlighted, and a reduction in carbon dioxide emission has been required in every situation for the purpose of preventing global warming. In particular, an automobile corresponding to a major source of carbon dioxide emission, especially an automobile equipped with a gasoline engine as a power source has been replaced with an electric vehicle equipped with a motor system 10 illustrated in FIG. 1.

(Configuration of Motor System 10)

As illustrated in FIG. 1, the motor system 10 includes, as main components, a motor 7, an inverter device 6 for controlling driving of the motor 7, a battery system 1 that discharges DC power to the inverter device 6 and is supplied and charged with DC power from the inverter device 6, and a relay 8 provided between the battery system 1 and the inverter device 6.

The electric vehicle is provided with an integrated control device 9 that controls driving of the vehicle and manages energy in the vehicle. The integrated control device 9 is connected to the inverter device 6 and the battery system 1 via a signal transmission path, for example, a vehicle area network to communicate with the inverter device 6 and the battery system 1 and exchange information therewith.

(Configuration of Motor 7)

For example, the motor 7 is a three-phase AC synchronous motor that operates by being supplied with three-phase AC power and generates rotational power to be used for driving the vehicle. In addition, the motor 7 serves as a generator that rotates by receiving rotational power from the vehicle and generates three-phase AC power. Here, the three-phase AC synchronous motor is given as an example of the motor 7. However, it is possible to use another motor, for example, a three-phase AC induction motor or a DC motor.

(Configuration of Inverter Device 6)

The inverter device 6 is a power conversion device that converts DC power into AC power by turning ON and OFF a semiconductor switch. The inverter device 6 converts DC power discharged from the battery system 1 into predetermined three-phase AC power and supplies the converted power to the motor 7. Further, the inverter device 6 converts the three-phase AC power supplied from the motor 7 into DC power and supplies the converted power to the battery system 1 to charge the battery system 1. When the motor 7 is a DC motor, a power conversion device that converts DC power into predetermined DC power is used. Examples of the power conversion device that converts DC power into predetermined DC power include a chopper device.

(Configuration of Relay 8)

The relay 8 controls electrical connection between the battery system 1 and the inverter device 6 based on a command signal from the inverter device 6. When an ignition key switch is turned ON to drive the vehicle, the relay 8 is turned ON to electrically connect between the inverter device 6 and the battery system 1. On the other hand, when the vehicle is stopped and the ignition key switch is turned OFF, the relay 8 is turned OFF, and electrical connection between the inverter device 6 and the battery system 1 is canceled. The command signal to the relay 8 may be output from the battery system 1 described below.

(Configuration of Battery System 1)

The battery system 1 (also referred to as a battery pack) includes, as main components, a battery module 2 having a plurality of battery cells 200 and a battery management system 3 that manages states of the plurality of battery cells 200.

The battery system 1 is required to have high output and large capacity as a power source for an electric vehicle. For this reason, the battery module 2 includes an assembled battery in which, for example, 96 battery cells 200 corresponding to lithium ion secondary batteries are electrically connected in series. The assembled battery may be configured by electrically connecting a plurality of battery cells in series-parallel. In this case, a plurality of battery cell groups, in which a plurality of battery cells are electrically connected in series, maybe electrically connected in parallel, or a plurality of battery cell groups, in which a plurality of battery cells are electrically connected in parallel, may be electrically connected in series. In addition, a battery cell 200 having any one of a cylindrical shape, a square shape, and a laminate shape may be used.

In the battery system 1 particularly using the lithium ion secondary battery as the battery cell 200, the battery cell 200 needs to be properly used by preventing high voltage charge or overcharge of the battery cell 200, or preventing performance deterioration due to overdischarge. For this reason, the battery management system 3 constantly manages a state of the battery cell 200 or the assembled battery by monitoring and controlling the state of the battery cell 200 or the assembled battery.

In order to manage the state of the battery cell 200 or the assembled battery, a state quantity of each of the plurality of battery cells 200 or a state quantity of the assembled battery needs to be acquired and collected, and various processes need to be performed to monitor or control a state of each of the plurality of battery cells 200 or a state of the assembled battery using collected information.

Examples of the state quantity of the battery cell 200 include a terminal voltage, a current, a temperature, etc. Examples of the state quantity of the assembled battery include a total voltage, a current, etc.

The various processes based on the collected information include a process of monitoring whether each of the plurality of battery cells 200 is in a state of high voltage charge, overcharge, or overdischarge, or is to be in the state of high voltage charge, overcharge, or overdischarge. In addition, there is a process of estimating and calculating a state of charge (SOC) and a state of health (SOH) of the battery cell 200 or the assembled battery. Furthermore, there is a process of controlling charge and discharge with respect to the assembled battery by calculating a control value for limiting or allowing charge and discharge with respect to the assembled battery, and outputting the calculated control value to the inverter device 6. Furthermore, there is a process of determining whether states of charge of the plurality of battery cells 200 are equal to each another, and charging or discharging batter cells 200 corresponding to equalization targets whose states of charge are larger or smaller than a reference threshold value when it is determined that the states need to be equalized, thereby equalizing (balancing) the states of charge of the plurality of battery cells 200.

Function sharing needs to be attempted to realize acquisition of a state quantity, collection of information related to the state quantity, and various processes based on the collected information. In particular, in a battery system having a large number of battery cells, function sharing is required to rapidly acquire state quantities of the battery cells 200 almost at the same time, thereby rapidly and accurately executing various processes. In this regard, as illustrated in FIG. 1, the battery management system 3 includes, as main components, a plurality of cell controllers (battery cell management devices) 30 that acquire state quantities of the plurality of battery cells 200, and a battery controller (assembled battery management device) 40 that collects the state quantities acquired by the plurality of cell controllers and executes various processes based on the collected information.

When the plurality of battery cells 200 is divided into a plurality of battery cell groups, the cell controllers 30 are provided to correspond to the plurality of respective battery cell groups. For example, twelve battery cells 200 electrically connected in series are set to one battery cell group, ninety-six battery cells 200 are divided such that twelve battery cells 200 are grouped together in order from a highest-order battery cell 200 to form eight battery cell groups, and one cell controller 30 is allocated to each of the eight battery cell groups. One, four, six, eight, or sixteen battery cells other than twelve battery cells may form one battery cell group.

The battery controller 40 is provided in common to the plurality of cell controllers 30 and collects state quantities of the battery cells 200 acquired by each of the plurality of cell controllers 30 by communication. Further, the battery controller 40 executes various processes based on information related to the respective collected state quantities, and outputs command signals to the plurality of cell controllers 30 or outputs state information, control information, etc. to a host controller such as the integrated control device 9 or the inverter device 6 (a motor controller that controls switching). Although not illustrated, the battery controller 40 collects state quantities (for example, a total voltage, a charge/discharge current, etc.) of the assembled battery from each sensor (a total voltage sensor and a current sensor) provided to the assembled battery. Further, when controlling the relay 8, the battery controller 40 outputs a control command for opening and closing to the relay 8.

Wireless communication is adopted for communication between the plurality of cell controllers 30 and the battery controller 40. Therefore, each of the plurality of cell controllers 30 is provided with an antenna 380 for transmitting and receiving a radio wave to and from the battery controller 40. The battery controller 40 is provided with an antenna 440 for transmitting and receiving a radio wave to and from each of the plurality of cell controllers 30. When compared with wired communication, wireless communication does not require a wire or insulation for a high voltage countermeasure, and may simplify a mounting property of the battery management system 3 and an assembly property of the battery system 1. In particular, it is advantageous when the power storage module 2 is arranged by being dispersed in several parts with respect to the vehicle.

(Configuration of Battery Management System 3)

Next, a detailed description will be given of configurations of the cell controllers 30 and the battery controller 40 with reference to FIG. 2.

(Configuration of Cell Controller 30)

The cell controller 30 is an information acquisition unit that acquires the state quantities of the battery cells 200. As illustrated in FIG. 2, the cell controller 30 includes an integrated circuit 300, a radio circuit 370, and an antenna 380 as main components. The components are mounted on a circuit board. Examples of a component of the cell controller 30 include a resistor used for balancing control of the battery cells 200, or a circuit element provided to a voltage detection line for detecting terminal voltages of the battery cells 200, for example, various circuit elements such as a filter circuit (for example, a resistor and a condenser included in an RC filter circuit), an inductor, a current limiting resistor, a capacitor for a countermeasure against static electricity, and a filter circuit provided in a signal transmission path between the integrated circuit 300 and the radio circuit 370. In addition, the examples include a large number of circuit elements such as a filter circuit provided to a signal transmission path between the integrated circuit 300 and the radio circuit 370. In addition, the examples include a connector for connecting a voltage detection line on the battery cell group 20 side and a voltage detection line on the cell controller 30 side. The circuit elements or terminal members are mounted on the circuit board. However, illustration thereof is omitted in FIG. 2.

The integrated circuit 300 operates by inputting voltages at both ends of a corresponding battery cell group 20 using the corresponding battery cell group 20 as a power supply. A voltage of the battery cell group 20 corresponds to a potential difference between an electric potential on a positive electrode side of a battery cell 200 at a highest potential and an electric potential on a negative electrode side of a battery cell 200 at a lowest potential among the plurality of battery cells 200 electrically connected in series. For this reason, the integrated circuit 300 operates using a potential of a negative electrode of the battery cell 200 at the lowest potential of the corresponding battery cell group 20 as a reference potential (ground potential). Potentials of battery cell groups 20 to which the cell controller 30 is electrically connected are different from each other. Therefore, the reference potential of the integrated circuit 300 is different for each cell controller 30. In addition, the assembled battery is not grounded, and is away from the chassis, and the reference potential corresponds to a floating potential.

The integrated circuit 300 is a main state quantity acquisition circuit in the information acquisition unit for acquiring the state quantities of the battery cells 200 and includes, as main components, a detection circuit 310, a power supply circuit 320, a counter 330, a logic circuit 340, a register 350, and a signal input/output circuit 360. The integrated circuit 300 is provided with a switching element for controlling electrical connection between a resistor used in balancing control and the battery cell 200, a driving circuit for driving the switching element, a circuit element for protecting an internal circuit, etc., which are not illustrated in FIG. 2.

The detection circuit 310 includes a voltage detector 311 that detects respective terminal voltages of a plurality of battery cells 200 included in the corresponding battery cell group 20, a current detector 313 that detects a current flowing through the corresponding battery cell group 20, and a temperature detector 312 that detects an external surface temperature of at least one battery cell 200 among the plurality of battery cells 200 included in the corresponding battery cell group 20.

The voltage detector 311 functions as a voltage sensor that inputs an electric potential of both ends (a positive electrode side and a negative electrode side) of each battery cell 200 through the voltage detection line, detects a terminal voltage of each battery cell 200 from this input potential difference, and outputs a signal related to a detection result. The voltage detector 311 includes a selector (multiplexer) that selects and outputs an electric potential of a battery cell 200 corresponding to a detection target from a plurality of electric potentials, a differential amplifier that takes a difference between potentials output from the selector, amplifies an analog signal indicating the potential difference, level-shifts a reference potential of the analog signal to the reference potential of the integrated circuit 300, and outputs the analog signal, and an analog-digital (AD) converter that converts the analog signal output from the differential amplifier into a digital signal and outputs the converted signal. For example, a configuration of the voltage detector 311 is known in JP 2000-14027 A. Information related to each terminal voltage detected by the voltage detector 311 is written to the register 350 by the logic circuit 340 and held.

The current detector 313 functions as a current sensor together with a current converter 22 provided in the middle of an electrical path of the battery cell group 200 to detect a current flowing through the battery cell group 200 and output a signal related to a detection result. The current detector 313 includes a differential amplifier that amplifies an electric signal (analog signal) output from the current converter 22 and level-shifts a reference potential of the analog signal to the reference potential of the integrated circuit 300, and outputs the analog signal, and an analog-digital (AD) converter that converts the analog signal output from the differential amplifier into a digital signal and outputs the converted signal. The current sensor may indicate only the current converter 22. The current converter 22 is a device or element that converts a current which is a physical quantity into an electric signal, and is, for example, a current transformer or a shunt resistor. Information related to the current detected by the current detector 313 is written in the register 350 by the logic circuit 340 and held.

The temperature detector 312 functions as a temperature sensor together with a temperature converter 21 attached to an external surface of at least one of the plurality of battery cells 200 included in the battery cell group 20 to detect an external surface temperature of a battery cell 200 corresponding to a measurement target and output a signal related to a detection result. The temperature detector 312 includes a differential amplifier that amplifies an electric signal (analog signal) output from the temperature converter 21 and level-shifts a reference potential of the analog signal to the reference potential of the integrated circuit 300, and outputs the analog signal, and an analog-digital (AD) converter that converts the analog signal output from the differential amplifier into a digital signal and outputs the converted signal. The temperature sensor may indicate only the temperature converter 21. The temperature converter 21 is a device or an element that converts a temperature which is a physical quantity into an electric signal, and is, for example, a thermistor or a thermocouple. Information related to the temperature detected by the temperature detector 312 is written to the register 350 by the logic circuit 340 and held.

The differential amplifier and the AD converter are provided for each detector. However, the differential amplifier and the AD converter may be provided for each detector in common. In this case, the signal output from the temperature converter 21 and the signal output from the current converter 22 may be selected in addition to the electric potential of both ends of each battery cell 200 using the selector (multiplexer) provided in the voltage detector 311.

The power supply circuit 320 is a voltage generation circuit that generates and supplies a voltage for operating each circuit in the integrated circuit 300, for example, the detection circuit 311, the logic circuit 340, the signal input/output circuit 360, etc. The power supply circuit 320 inputs a voltage of both ends (a potential difference between a highest potential and a lowest potential) of a corresponding battery cell group 20 to generate two different voltages (Vcc, Vdd), and supplies the voltages to each circuit. Referring to the two different voltages, Vcc is the same voltage as the input voltage, and Vdd is a constant voltage smaller than Vcc, for example, 3 volts or 5 volts. For example, Vcc is supplied to the detection circuit 311 as an operation voltage of the selector (multiplexer) of the detection circuit 311. For example, Vdd is supplied to the detection circuit 311, the logic circuit 340, and the signal input/output circuit 360 as operation voltages of the differential amplifier or the AD converter of the detection circuit 311, the logic circuit 340, and the signal input/output circuit 360.

The logic circuit 340 is a control (processing) circuit for controlling an operation of the integrated circuit 300. The logic circuit 340 controls an operation of the detection circuit 311 based on a command signal input through the signal input/output circuit 360 or a count value output from the counter 330 to acquire state quantities such as a terminal voltage of each battery cell 200, a current flowing through the battery cell group 20, a temperature of a predetermined battery cell 200, etc. and write the respective acquired state quantities to the register 350, or read respective state quantities written to the register 350 and output the read state quantities to the radio circuit 370 through the signal input/output circuit 360. In addition, the logic circuit 340 outputs a command signal for controlling ON/OFF of a switching element for balancing control to a driving circuit of the switching element to control a balancing operation. Further, the logic circuit 340 controls an operation of a diagnostic circuit (not illustrated) to diagnose whether the battery cell 200 is in a state of high voltage charge, overcharge, or overdischarge, or is to be in the state of high voltage charge, overcharge, or overdischarge, and whether each circuit in the integrated circuit 300 is abnormal, and transmit an abnormality signal to the radio circuit 370 through the signal input/output circuit 360 when there is an abnormality. Furthermore, the logic circuit 340 controls power supply from the power supply circuit 320 to each circuit, and switches the integrated circuit 300 from an operation mode to a standby mode or a low power consumption mode to cut off power supply to a circuit that may not be operated from the power supply circuit 320, thereby suppressing discharge of the battery cell 200 when each state quantity may not be acquired or output.

The counter 330 is a multi-counter that can perform timekeeping and measurement at the same time a plurality of number of times. For example the counter 330 performs timekeeping necessary to control operation timing of each control operation by the logic circuit 340 or timing of communication with the battery controller 40, counting necessary to know the number of errors, etc. At the time of performing timekeeping, the counter 330 starts timekeeping based on a timekeeping signal output from the logic circuit 340, and counts up a count value by "1" at a time at a predetermined period. When the count value reaches a predetermined count value, the counter 330 notifies the logic circuit 340 that the count value has reached the predetermined count value. Meanwhile, at the time of performing counting, the counter 330 adds "1" to the count value based on a counting signal output from the logic circuit 340. When the count value reaches a predetermined count value, the counter 330 notifies the logic circuit 340 that the count value has reached the predetermined count value. In addition, the counter 330 resets each count value to "0" based on a reset signal output from the logic circuit 340. When timekeeping is performed, a timer rather than the counter may be used.

The register 350 is a memory for storing information necessary for an operation or information obtained by an operation, or a holder for holding such information. Individual identification information or address information for identifying a cell controller 30 in communication at the time of communication with the battery controller 40, a threshold value (reference value) necessary for diagnosis by the diagnostic circuit, etc. are stored as the information necessary for the operation. In addition, a state quantity such as a terminal voltage of each battery cell 200, a current flowing in the battery cell group 20, a temperature of a predetermined battery cell 200, etc., a result obtained by diagnosis by the diagnostic circuit, etc. are stored as the information obtained by the operation in the register 350.

The signal input/output circuit 360 is an interface circuit electrically connected to the radio circuit 370. The signal input/output circuit 360 generates a signal corresponding to the radio circuit 370 based on a signal output from the logic circuit 340 to output the generated signal to the radio circuit 370, and generates a signal corresponding to the logic circuit 340 based on a signal output from the radio circuit 370 to output the generated signal to the logic circuit 340.

The radio circuit 370 operates using a voltage Vcc supplied from the power supply circuit 320 as a power supply, and includes, as main components, a modulation circuit that modulates a carrier wave by a signal (modulated wave) output from the signal input/output circuit 360 to generate a transmitted wave, and a demodulation circuit for demodulating a signal (modulated wave) input to the signal input/output circuit 360 by removing a carrier wave from a received wave obtained from the antenna 380.

The antenna 380 is a signal medium converter that converts a transmitted wave output from the radio circuit 370 into a radio wave to transmit the radio wave to the battery controller 40, and receives a radio wave output from the battery controller 40 to convert the radio wave into a received wave input to the radio circuit 370 and input the wave to the radio circuit 370.

(Configuration of Battery Controller 40)

The battery controller 40 is an information collection unit for collecting state quantities of the battery cell 200, the battery cell group 20, and the assembled battery, and a processing unit for executing various processes based on the respective collected state quantities. As illustrated in FIG. 2, the battery controller 40 includes a microcomputer 410, a power supply circuit 420, a radio circuit 430, and an antenna 440 as main components. These components are mounted on a circuit board. Components of the battery controller 40 include a total voltage detection circuit for detecting a total voltage of the assembled battery, a leak detection circuit for detecting whether electric leakage occurs in the assembled battery, etc. These components are mounted on the circuit board. However, illustration thereof is omitted in FIG. 2.

The power supply circuit 420 is a voltage generation circuit that generates and supplies a voltage for operating the microcomputer 410, the radio circuit 430, etc. The power supply circuit 420 inputs a voltage of a built-in battery to generate two different voltages (Vcc, Vdd), and supplies the generated voltages to the microcomputer 410 and the radio circuit 430. Referring to the two different voltages, Vcc is the same voltage as an input voltage, and Vdd is a constant voltage smaller than Vcc, for example, 3 volts or 5 volts. For example, Vcc is supplied to the radio circuit 430 as an operation voltage of the radio circuit 430. For example, Vdd is supplied to the microcomputer 410 as an operation voltage of the microcomputer 410. A battery that supplies a voltage to the power supply circuit 420 may not be incorporated, and a 14-volt-type battery mounted on the vehicle may be used as an external battery, for example, a battery for driving electrical components.

The microcomputer 410 operates using a voltage (Vcc) supplied from the power supply circuit 420 as a power source, and uses a potential on a negative electrode side of the built-in battery as a reference potential. Since the negative electrode side of the built-in battery is electrically connected to the chassis of the vehicle and is grounded, the reference potential of the microcomputer 410 is the same potential as a potential of the chassis.

The microcomputer 410 is a main state quantity collection circuit in an information collection unit that collects each state quantity from each cell controller 30 and is a main arithmetic processing circuit in a processing unit that executes various processes based on each collected state quantity. The microcomputer 410 includes a central processing unit (CPU) 411, a memory 412, a counter 413, and an input/output unit (I/O) 414 as main components. The arithmetic processing unit 411, the memory 412, the counter 413, and the input/output unit 414 are electrically connected by a bus 415 so that signals can be mutually transmitted.

The central processing unit 411 estimates and calculates a state of charge (SOC) or a state of health (SOH) of the battery cell 200 or the assembled battery based on each collected state quantity, calculates a control value for limiting or allowing charge and discharge with respect to the assembled battery, or determines whether states of charge of the battery cells 200 are equal to each other. When it is determined that equalization is required, the central processing unit 411 calculates a degree (for example, time) at which a battery cell 200 corresponding to an equalization target is charged or discharged.

The memory 412 is used to store information necessary for calculation of the central processing unit 411, information obtained by calculation of the central processing unit 411, etc. Examples of the information necessary for calculation of the central processing unit 411 include a map indicating a characteristic of the battery cell 200, for example, a map indicating a relation between an open-circuit voltage and a state of charge of the battery cell 200 or a map indicating a relation among an open-circuit voltage, a temperature, and an internal resistance of the battery cell 200, and each collected state quantity. Examples of the information obtained by calculation of the central processing unit 411 include a state of charge (SOC), a state of health (SOH), and a control value for limiting or allowing charge and discharge. In addition, the memory 412 stores individual identification information or address information of each cell controller 30, or stores a result of abnormality diagnosis, etc.

The counter 413 is a multi-counter that can perform timekeeping and measurement at the same time a plurality of number of times. For example, the counter 413 performs timekeeping necessary to control operation timing of each operation by the central processing unit 411 or timing of communication with the cell controller 30, counting necessary to know the number of errors, etc. At the time of performing timekeeping, the counter 413 starts timekeeping based on a timekeeping signal output from the central processing unit 411, and counts up a count value by "1" at a time at a predetermined period. When the count value reaches a predetermined count value, the counter 413 notifies the central processing unit 411 that the count value has reached the predetermined count value. Meanwhile, at the time of performing counting, the counter 413 adds "1" to the count value based on a counting signal output from the central processing unit 411. When the count value reaches a predetermined count value, the counter 413 notifies the central processing unit 411 that the count value has reached the predetermined count value. In addition, the counter 413 resets each count value to "0" based on a reset signal output from the central processing unit 411. When timekeeping is performed, a timer rather than the counter may be used.

The counter 330 is a multi-counter that can perform timekeeping and measurement at the same time a plurality of number of times. For example, the counter 330 performs timekeeping necessary to control operation timing of each control operation by the logic circuit 340 or timing of communication with the battery controller 40, counting necessary to know the number of errors, etc. At the time of performing timekeeping, the counter 330 starts timekeeping based on a timekeeping signal output from the logic circuit 340, and counts up a count value by "1" at a time at a predetermined period. When the count value reaches a predetermined count value, the counter 330 notifies the logic circuit 340 that the count value has reached the predetermined count value. Meanwhile, at the time of performing counting, the counter 330 adds "1" to the count value based on a counting signal output from the logic circuit 340. When the count value reaches a predetermined count value, the counter 330 notifies the logic circuit 340 that the count value has reached the predetermined count value. In addition, the counter 330 resets each count value to "0" based on a reset signal output from the logic circuit 340. When timekeeping is performed, a timer rather than the counter may be used.

The input/output unit 414 is an interface circuit electrically connected to a motor controller mounted on the radio circuit 430, the integrated control device 9, or the inverter device 6. The input/output unit 414 generates a signal corresponding to the motor controller mounted on the radio circuit 430, the integrated control device 9, or the inverter device 6 based on a signal output from the central processing unit 411 to output the generated signal to the motor controller mounted on the radio circuit 430, the integrated control device 9, or the inverter device 6, and generates a signal corresponding to the central processing unit 411 based on a signal output from the motor controller mounted on the radio circuit 430, the integrated control device 9, or the inverter device 6 to output the generated signal to the central processing unit 411.

The radio circuit 430 operates using a voltage Vcc supplied from the power supply circuit 420 as a power supply, and includes, as main components, a modulation circuit that modulates a carrier wave by a signal (modulated wave) output from the input/output unit 414 to generate a transmitted wave, and a demodulation circuit for demodulating a signal (modulated wave) input to the input/output unit 414 by removing a carrier wave from a received wave obtained from the antenna 440.

The antenna 440 is a signal medium converter that converts a transmitted wave output from the radio circuit 430 into a radio wave to transmit the radio wave to the cell controller 30, and receives a radio wave output from the cell controller 30 to convert the radio wave into a received wave input to the radio circuit 430 and input the wave to the radio circuit 430.

Examples of a medium used for wireless communication include light, for example, an infrared ray in addition to a radio wave. When wireless communication using an infrared ray is performed, the radio circuit 370 and the antenna 380 of each cell controller 30 and the radio circuit 430 and the antenna 440 of the battery controller 40 may be replaced with radio circuits and converters adapt for the infrared ray.

Figure 2:
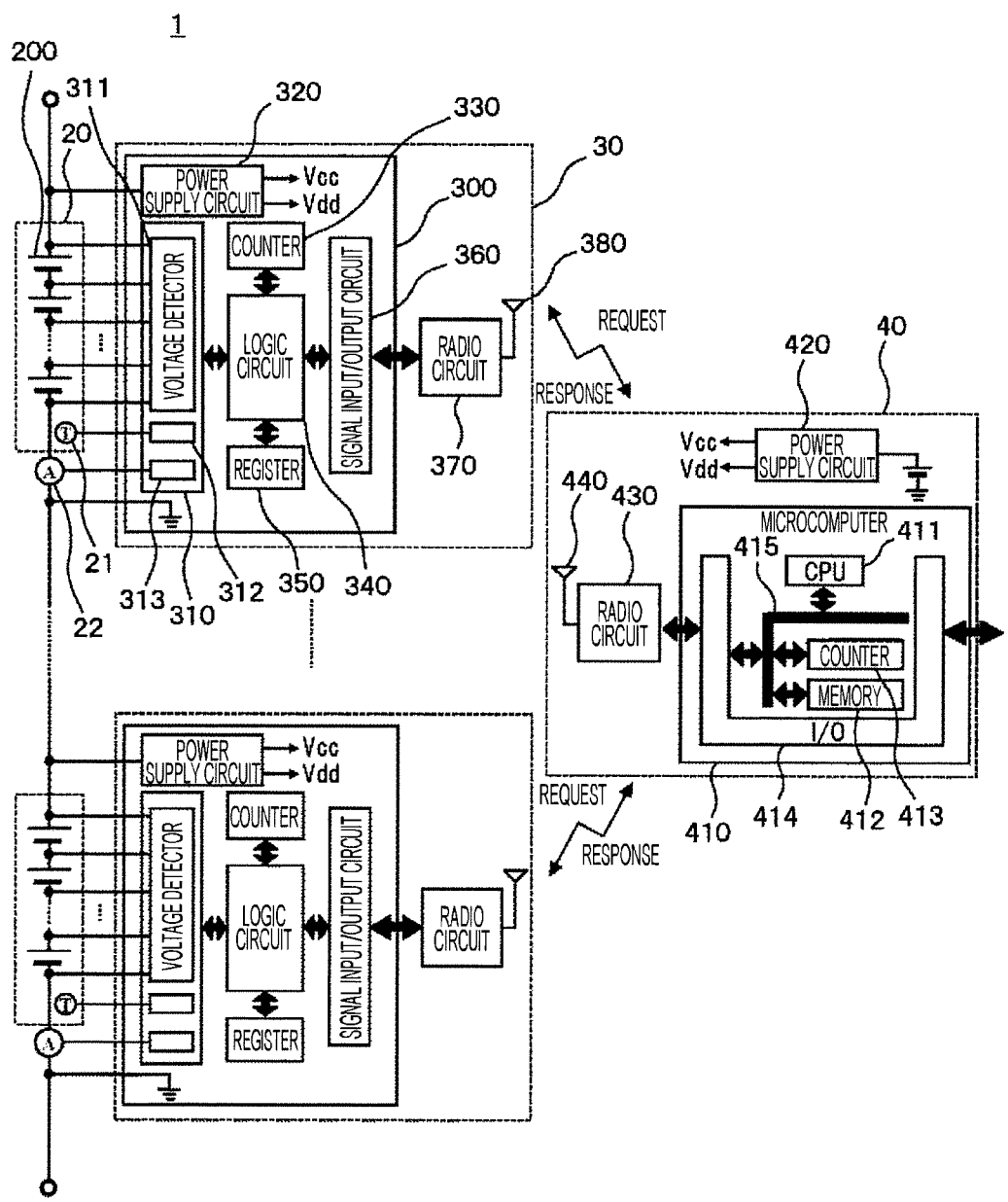
FIG. 2 is a block diagram illustrating a specific configuration of the battery management system of FIG. 1.

In addition, in FIG. 2, each of the counters 330 and 413 is shown in one block for illustration. However, actually, a plurality of counters may be included. An example in which two counters are used in each of the cell controller 30 and the battery controller 40 is given in description of an operation below.

(Operation of Battery Management System 3)

Figure 14:
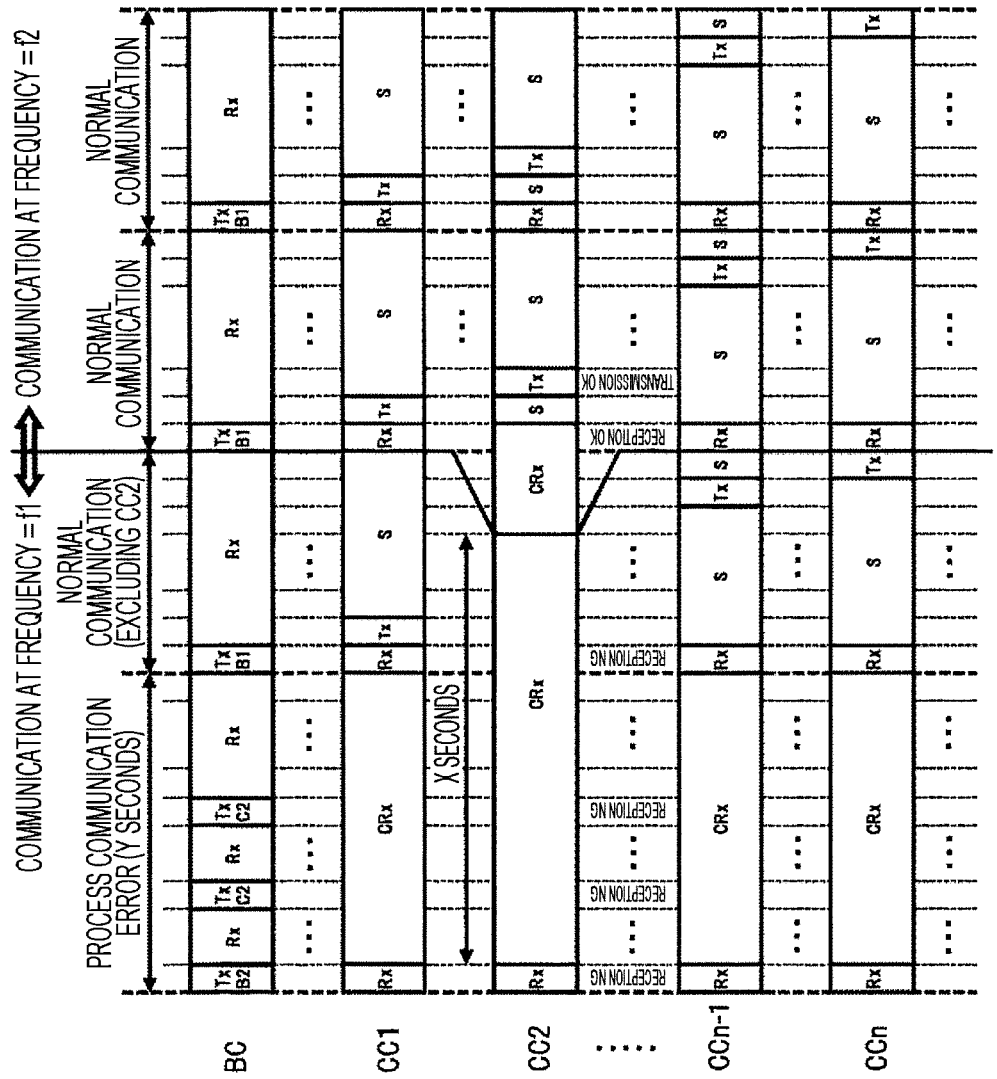
FIG. 14 is a timing chart illustrating a communication state of a battery management system according to Embodiment 2, and illustrates a change in the communication state in which recovery from a communication error by communication error processing fails, and the battery management system is recovered from the communication error when a frequency is changed and communication is resumed.
Figure 15:
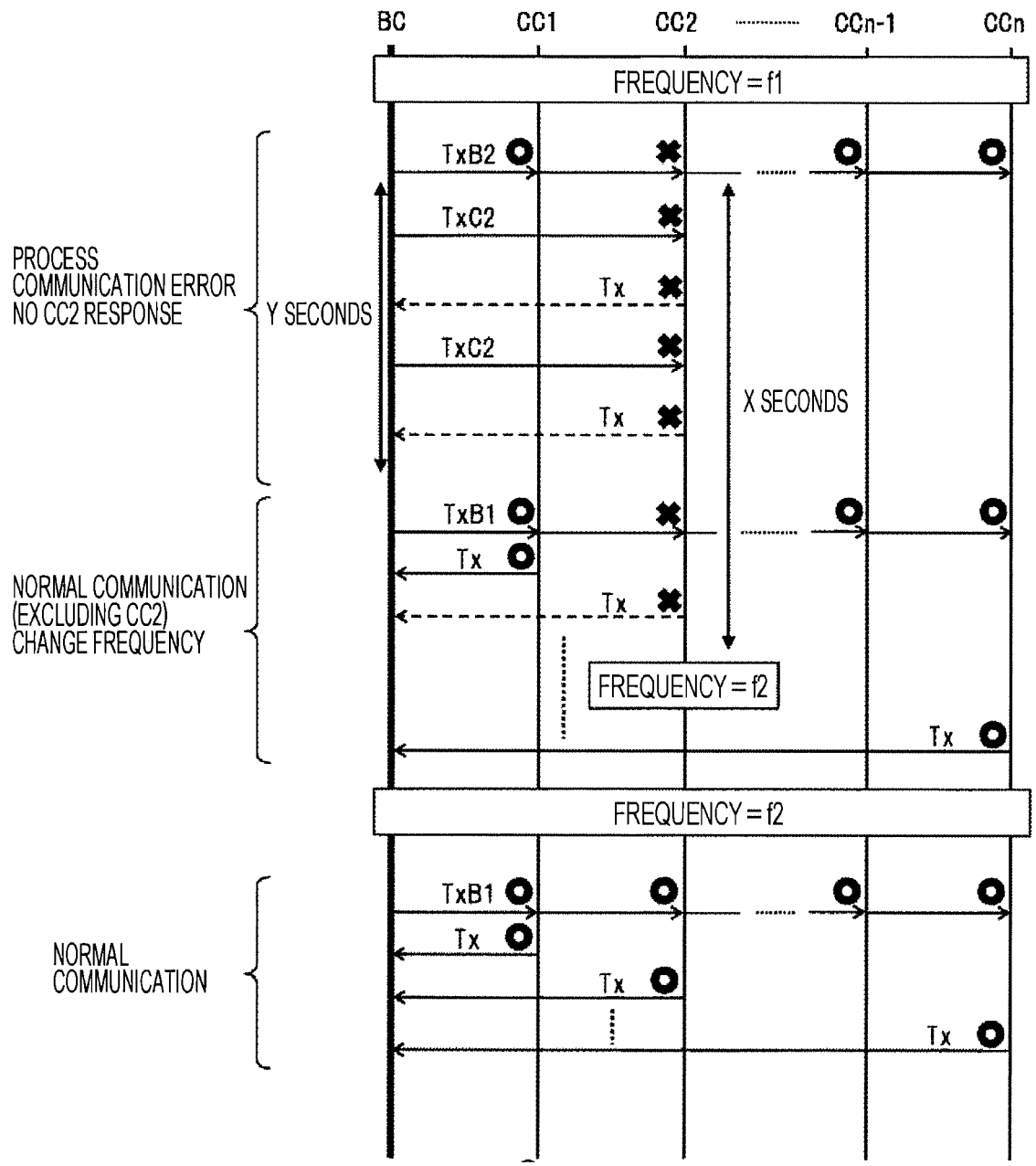
FIG. 15 is a diagram illustrating a communication sequence of the battery management system according to Embodiment 2, and illustrates a communication sequence in the communication state of FIG. 14.

Next, a description will be given of an operation of the battery management system 3, in particular, an operation in a case in which a communication error occurs in wireless communication between each cell controller 30 and the battery controller 40 with reference to FIG. 3 to FIG. 15. In FIG. 15, O indicates reception or transmission success, and X indicates reception or transmission failure.

In the battery management system 3, from a viewpoint communication, the battery controller 40 operates as a master (master unit), and each cell controller 30 operates as a slave (slave unit). In communication between the battery controller 40 and each cell controller 30, a request (transmission of a command signal) from the battery controller 40 to each cell controller 30, acquisition of a state quantity in each cell controller 30, and transmission (response) of a state quantity from each cell controller 30 to the battery controller 40 are performed as a communication operation for one period, and this communication operation is periodically repeated. In the communication operation for one period, each operation is performed by shifting time by 1 bit, that is, by time division. The request (transmission of the command signal) from the battery controller 40 to each cell controller 30 is performed at one time with one bit. The acquisition of the state quantity in the cell controller 30 and the transmission (response) of the state quantity from the cell controller 30 to the battery controller 40 correspond to one set of operations, in which time is shifted by 1 bit at a time for each cell controller 30, performed according to a preset order.

In communication, a communication error may occur due to an influence of disturbance regardless of a wired or wireless scheme. However, the influence of disturbance is more likely to be received by the wireless scheme than the wired scheme. For this reason, a frequency of occurrence of communication errors due to disturbance tends to be higher in the wireless scheme than in the wired scheme. Even when a communication error occurs, if communication is recovered from the communication error at an early stage, it is possible to suppress deterioration in communication quality. Therefore, in the battery management system 3, when a communication error occurs in at least one cell controller 30 in communication between the battery controller 40 and each cell controller 30, an operation is performed such that communication with a cell controller 30 in which the communication error occurs is recovered at an early stage. In addition, in order to suppress deterioration in the communication quality, communication between each of remaining cell controllers 30, in which no communication error occurs, and the battery controller 40 needs to be maintained. Therefore, in the battery management system 3, when a communication error occurs in at least one cell controller 30, an operation is performed such that communication between each of remaining cell controllers 30, in which no communication error occurs, and the battery controller 40 is maintained. In this way, deterioration in communication quality is suppressed in the battery management system 3.

Hereinafter, a process at the time of a communication error will be described in detail using communication timing illustrated in FIG. 12 and a communication sequence illustrated in FIG. 13 along the operation of the battery management system 3 illustrated in FIGS. 3 to 11.

Figure 3:
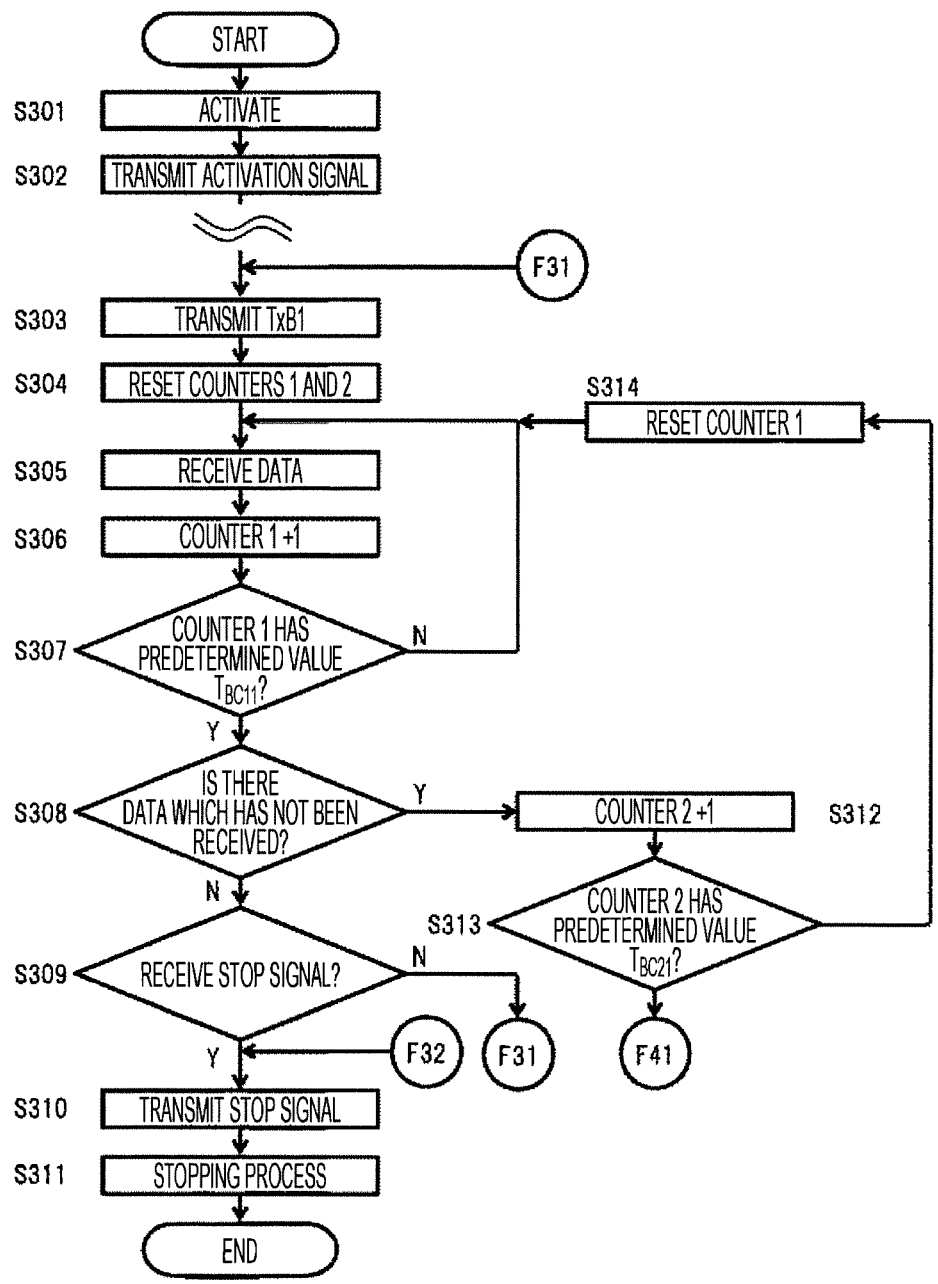
FIG. 3 is a flowchart illustrating an operation of a battery controller of FIG. 2.
Figure 4:
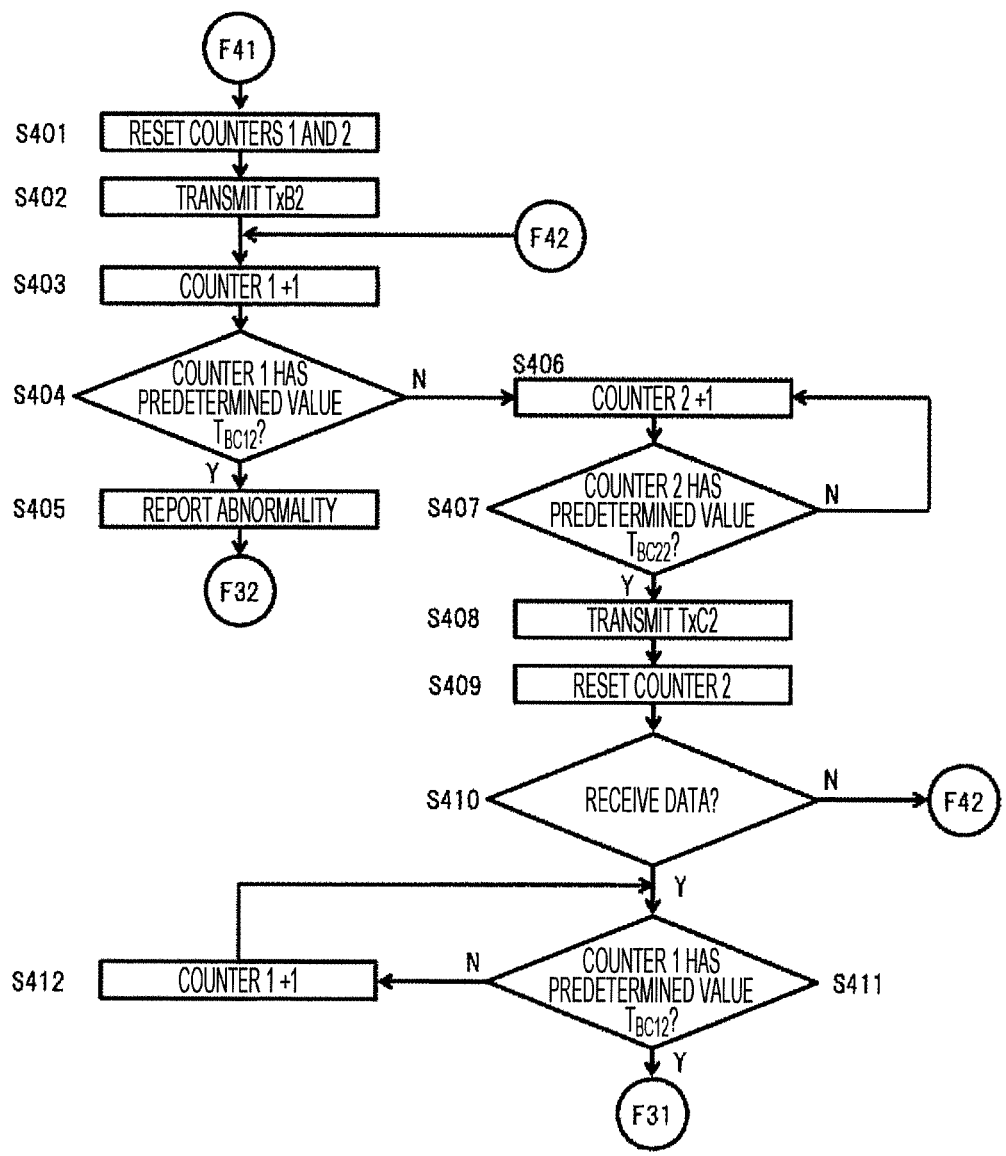
FIG. 4 is flowchart illustrating continuation of the operation of FIG. 3.

FIGS. 3 and 4 illustrate a flow of an operation of the battery controller 40. FIGS. 5 to 11 illustrate a flow of an operation of each cell controller 30. FIG. 12 illustrates communication timing between the battery controller 40 and each cell controller 30. FIG. 13 illustrates a communication sequence between the battery controller 40 and each cell controller 30. In FIGS. 12 and 13, BC indicates the battery controller 40, and CC1 to CCn indicate the cell controllers 30. In FIG. 12, TxB1 denotes a data readout request from BC to each CC, Tx denotes a state of data transmission from CC to BC, TxB2 denotes a continuous reception request from BC to each CC, CRx denotes a continuous reception state, TxC2 denotes a data readout request from BC to CC2 (communication error CC), S denotes a sleep (low power consumption standby) state, and Rx denotes a reception state. In FIG. 13, 0 indicates reception or transmission success, and X indicates reception or transmission failure.

—Activation of Battery Management System 3—

Activation of the battery management system 3 is performed by acquiring a trigger signal. The trigger signal is a signal indicating turning ON of the ignition key switch of the vehicle and is output from the integrated control device 9 to the signal transmission path. When the battery management system 3 acquires the trigger signal, first, the battery controller 40 is activated, and then each cell controller 30 is activated by an activation signal output from the battery controller 40.

——Activation Process 1 of Battery Controller 40——

When the ignition key switch of the vehicle is turned ON, a signal indicating that the ignition key switch has been turned ON is output from the integrated control device 9 to the signal transmission path. When the battery controller 40 receives the output signal as an activation signal, the battery controller 40 is activated as illustrated in S301 of FIG. 3. Here, activation of the battery controller 40 means that upon receipt of the activation signal, the power supply circuit 420 applies an operation voltage to the microcomputer 410 or each circuit such as the radio circuit 430, thereby starting an operation of the microcomputer 410 or each circuit such as the radio circuit 430.

When the battery controller 40 is activated, an initial operation such as abnormality diagnosis or initialization of each circuit in the battery controller 40 is performed. When there is no abnormality in this initial operation, activation signals are simultaneously transmitted from the battery controller 40 to the respective cell controllers 30 as illustrated in S302 of FIG. 3. Thereafter, the battery controller 40 waits for responses from the respective cell controllers 30. On the other hand, when there is an abnormality in the initial operation, a signal indicating that there is an abnormality is transmitted from the battery controller 40 to the integrated control device 9. Thereafter, the battery controller 40 suspends subsequent operations to suspend supply of a voltage from the power supply circuit 420 to each circuit, and shuts down the battery controller 40.

——Activation Process 1 of Cell Controller 30——

When activation signals are simultaneously transmitted from the battery controller 40, each of the activation signals is received by the antenna 380 of each cell controller 30 and input to the integrated circuit 300 through the radio circuit 370. When the activation signals are input to the integrated circuit 300, each cell controller 30 is activated as illustrated in S501 of FIG. 5. Here, activation of the cell controller 30 means that upon receipt of the activation signal, the power supply circuit 320 in the integrated circuit 300 applies an operation voltage to each circuit such as the logic circuit 340 in the integrated circuit 300 or the radio circuit 370 outside the integrated circuit 300, thereby starting n operation of each circuit such as the logic circuit 340 in the integrated circuit 300 or the radio circuit 370 outside the integrated circuit 300.

When each cell controller 30 is activated, an initial operation such as abnormality diagnosis or initialization of each circuit in each cell controller 30 is performed. When there is no abnormality in this initial operation, a signal indicating that activation has completed is sent from each cell controller 30 to the battery controller 40. On the other hand, when there is an abnormality in the initial operation, a signal indicating that there is an abnormality is sent from a cell controller 30 having the abnormality to the battery controller 40. After transmission of an activation completion signal or an abnormality signal, each cell controller 30 waits for a subsequent command signal transmitted from the battery controller 40 while maintaining an activation state.

——Activation Process 2 of Battery Controller 40——

Although not illustrated in the flow of FIG. 3, when a signal indicating that activation has completed is sent from each cell controller 30, command signals for requesting an output of a terminal voltage (open circuit voltage) of the battery cell 200 in a no-load state (the relay 8 is in an OFF state) are simultaneously transmitted from the battery controller 40 to the respective cell controllers 30. Thereafter, the battery controller 40 waits for responses from the respective cell controllers 30. When a signal related to data is sent from each cell controller 30, the terminal voltage of each battery cell 200 is stored as an open circuit voltage (OCV) in the memory 412, and an initial state of charge (SOC) of each battery cell 200 is calculated based on the open circuit voltage corresponding to the terminal voltage of each battery cell 200 and stored in the memory 412. In addition, whether balancing control is necessary is determined based on the initial charged state of each battery cell 200. When balancing control is necessary, a control value such as a time for discharging or charging a battery cell 200 to be subjected to balancing control is calculated and stored in the memory 412. Thereafter, the battery controller 40 determines that initial preparation has completed, and transmits a signal indicating that the relay 8 maybe turned ON to the integrated control device 9.

Meanwhile, when a signal indicating that activation has completed or a signal indicating that there is an abnormality in the cell controller 30 is sent to the battery controller 40 from at least one cell controller 30 among the plurality of cell controllers 30, it is determined that there is an abnormality in the cell controller 30, and suspension command signals are simultaneously transmitted from the battery controller 40 to the respective cell controllers 30. When a signal indicating that there is an abnormality in a result of a diagnosis of an open circuit voltage is sent to the battery controller 40 from at least one cell controller 30 among the plurality of cell controllers 30, it is determined that there is an abnormality in the battery cell 200, and suspension command signals are simultaneously transmitted from the battery controller 40 to the respective cell controllers 30. In this way, the respective cell controllers 30 are shut down. Thereafter, the battery controller 40 suspends subsequent operations to suspend supply of a voltage from the power supply circuit 420 to each circuit, and shuts down the battery controller 40.

——Activation Process 2 of Cell Controller 30——

Figure 5:
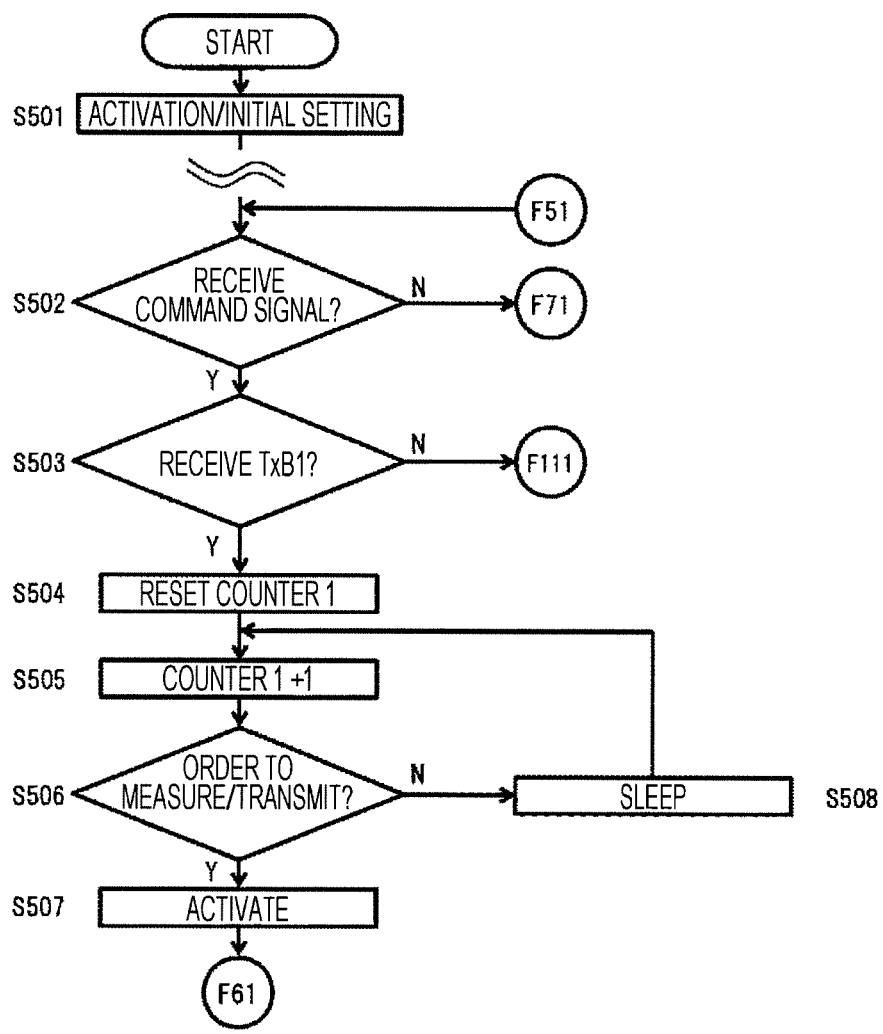
FIG. 5 is flowchart illustrating an operation of a cell controller of FIG. 2, and illustrates an operation of the cell controller when communication is normal.

Although not illustrated in the flow of FIG. 5, when a command signal for requesting an output of the terminal voltage (open circuit voltage) of the battery cell 200 is transmitted from the battery controller 40 to each cell controller 30 after the cell controller 30 is activated, a terminal voltage of each of the plurality of battery cells 200 included in a corresponding battery cell group 20 is detected in each cell controller 30, and data related to the terminal voltage acquired by the detection is written to the register 350 and transmitted to the battery controller 40. In addition, in each cell controller 30, the detected terminal voltage is compared with each threshold value for diagnosis of overcharge or overdischarge to diagnose whether an abnormality such as overcharge or overdischarge is present in each battery cell 200, and a diagnosis result is written to the register 350. Further, when there is an abnormality as a result of diagnosis, the result is transmitted to the battery controller 40 together with a result of detection of the terminal voltage. Thereafter, each cell controller 30 waits for a subsequent command signal transmitted from the battery controller 40 while maintaining the activation state.

——Normal Operation of Battery Management System 3——

When the relay 8 is turned ON, the battery system 1 and the inverter device 6 are electrically connected, and a current flows between the battery system 1 and the inverter device 6. When this state is detected by the battery controller 40, the battery management system 3 starts a normal operation. The current flowing between the battery system 1 and the inverter device 6 may be detected based on information from a current sensor for detecting a current flowing in the assembled battery.

Basically, the battery management system 3 sets acquisition of a state quantity of the battery cell 200 by each cell controller 30 and acquisition of a state quantity of the battery cell 200 by the battery controller 40 to an operation of one period, and periodically repeats this operation.

Hereinafter, in order to simplify description, the acquisition of the state quantity of the battery cell 200 in each cell controller 30 will be described by being restricted to acquisition of the terminal voltage of the battery cell 200. The terminal voltage of the battery cell 200 is periodically and repeatedly acquired. However, the current flowing in the battery cell group 20 and the temperature of the battery cell 200 may be acquired in every period or once in several periods.

——Transmission of TxB1 Command Signal——

Figure 12:
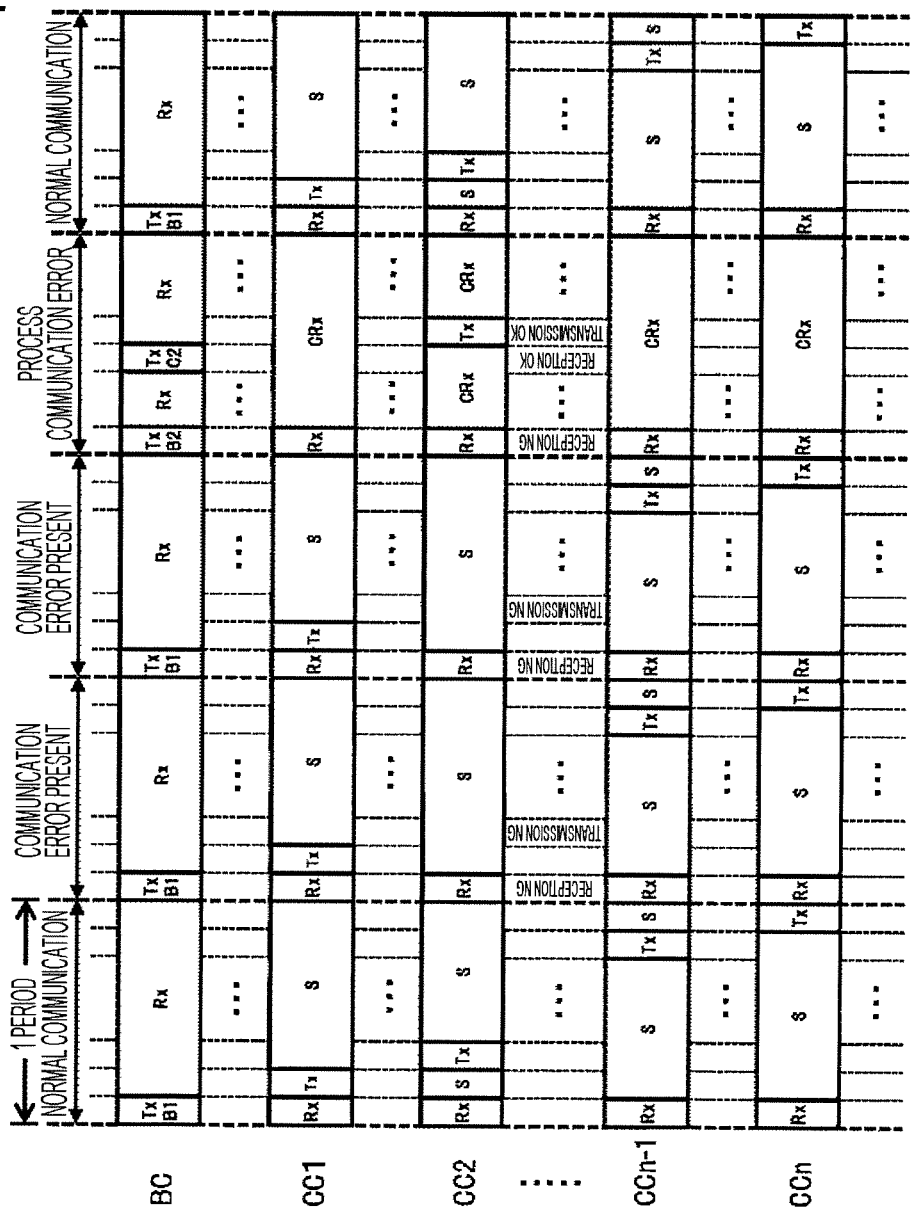
FIG. 12 is a timing chart illustrating a communication state of the battery management system of FIG. 2, and illustrates a change in the communication state in which a communication error occurs and the battery management system is recovered from the communication error by communication error processing.
Figure 13:
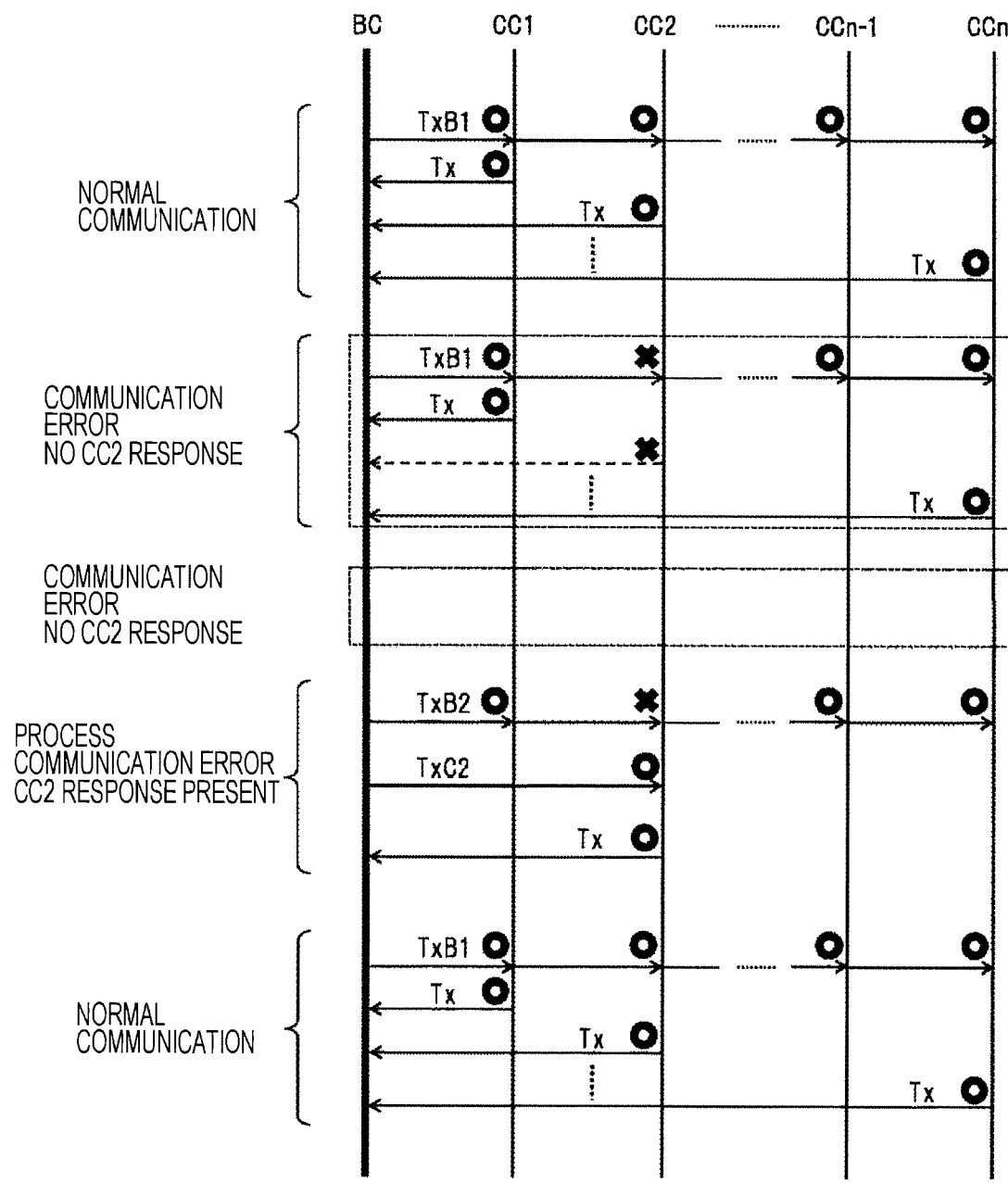
FIG. 13 is a diagram illustrating a communication sequence of the battery management system of FIG. 2, and illustrates a communication sequence in the communication state of FIG. 12.

When the normal operation is started, a command signal related to a data readout request (TxB1) of the terminal voltage of the battery cell 200 is transmitted from the battery controller 40 to each cell controller 30 using a broadcast command indicating a simultaneous transmission command as shown in S303 of FIG. 3 and indicated by BC of FIG. 13 in an initial period among a plurality of time division periods as indicated by BC of FIG. 12.

Thereafter, as shown in S304 of FIG. 3, the counters 1 and 2 are reset based on transmission of the command signal related to the data readout request (TxB1), and counting of the counter 1 in the counters 1 and 2 is started. The counters 1 and 2 are two of the plurality of counters included in the counter 413. Here, in the normal operation, the counter 1 is used for timekeeping and the counter 2 is used for counting. The usage of the counter may be changed, and the counters 1 and 2 are used for timekeeping in a communication error operation.

——Reception of TxB1 Command Signal——

Meanwhile, as indicated by CC1 to CCn of FIG. 12, the command signal transmitted from the battery controller 40 is received by each cell controller 30 in a reception state (Rx) in the initial period among the plurality of time division periods. In this instance, in each cell controller 30, it is determined whether reception of the command signal has succeeded or failed as shown in S502 of FIG. 5 and indicated by CC1 to CCn of FIG. 13. When it is affirmatively determined that reception of the command signal has succeeded as a result of determination, it is determined whether the received command signal is TxB1 in S503 of FIG. 5. Thereafter, as shown in S503 of FIG. 5, it is determined whether the command signal is TxB1. When it is affirmatively determined that the command signal is TxB1 in S503, the operation proceeds to S504 of FIG. 5.

Upon receiving the command signal which is TxB1, the logic circuit 340 resets the counter 330. The counter 330 is a multi-counter. Here, two counters are used. Here, when the two counters are counters 1 and 2, only the counter 1 is used for timekeeping in the normal operation. The counter 2 is used for timekeeping together with the counter 1 in the communication error operation. The logic circuit 340 resets the counter 1 as shown in S504 of FIG. 5 based on reception of the command signal related to the data readout request (TxB1), and starts counting of the counter 1 to perform counting in a preset period. Thereafter, as shown in S505 of FIG. 5, the count 1 is counted by "1". Thereafter, as shown in S506 of FIG. 5, it is determined whether a count value corresponds to a predetermined value, that is, whether the terminal voltage of the battery cell 200 is acquired, and the acquired terminal voltage is to be transmitted to the battery controller 40 this time.

When the logic circuit 340 affirmatively determines that the terminal voltage is to be transmitted this time in S506 of FIG. 5, the logic circuit 340 activates the cell controller 30 or maintains activation of the cell controller 30 as shown in S507 of FIG. 5. On the other hand, when the logic circuit 340 negatively determines that the terminal voltage is not to be transmitted this time in S506 of FIG. 5, the logic circuit 340 allows the cell controller 30 to sleep as shown in S508 of FIG. 5. Thereafter, the operation returns to S505 of FIG. 5, and the count 1 is counted by "1". In S506 of FIG. 5, it is determined again that whether the acquired terminal voltage is to be transmitted to the battery controller 40 this time. When it is affirmatively determined that the terminal voltage is to be transmitted this time as a result of redetermination, the cell controller 30 is activated in S507 of FIG. 5. When it is negatively determined that the terminal voltage is not to be transmitted this time, the cell controller 30 is allowed to continuously sleep in S508 of FIG. 5. Sleeping corresponds to a low power consumption mode for suppressing power consumption in the cell controller 30, and use of power supplied from the battery cell group 20 is suppressed to a minimum requirement in this mode.

Figure 7:
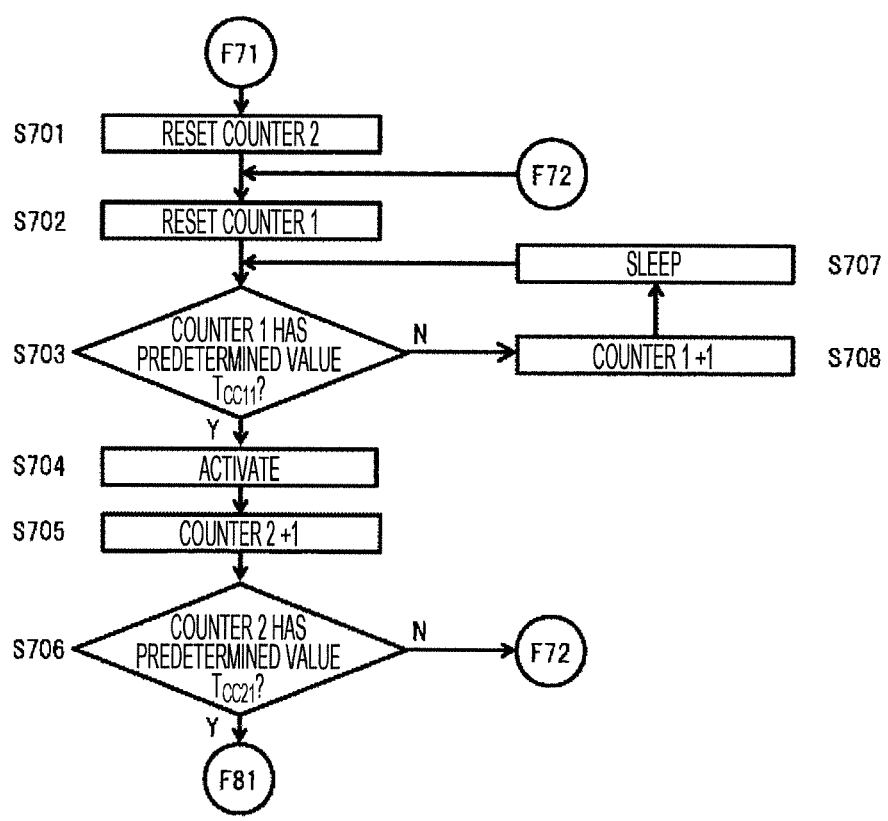
FIG. 7 is flowchart illustrating an operation of the cell controller of FIG. 2, and illustrates an operation of the cell controller in which a communication error occurs when the communication error occurs.

When it is negatively determined in S502 of FIG. 5, the operation proceeds to S701 of FIG. 7. This case will be described below as an operation when there is an abnormality in the cell controller. In addition, when it is negatively determined in S503 of FIG. 5, the operation proceeds to S1101 of FIG. 11. A round terminal represents connection of a flow. A symbol in the round terminal indicates a figure number and a terminal number corresponding to a destination or a source of the flow. For example, F71 indicates a terminal 1 of FIG. 7. In S1101 of FIG. 11, the count value of the counter 1 is reset. In S1102, it is determined whether the count value of the counter 1 is a predetermined value Tcc12. When the counter 1 corresponds to the predetermined value Tcc12, the operation returns to S502 of FIG. 5.

——Acquisition and Transmission of Data——

Figure 6:
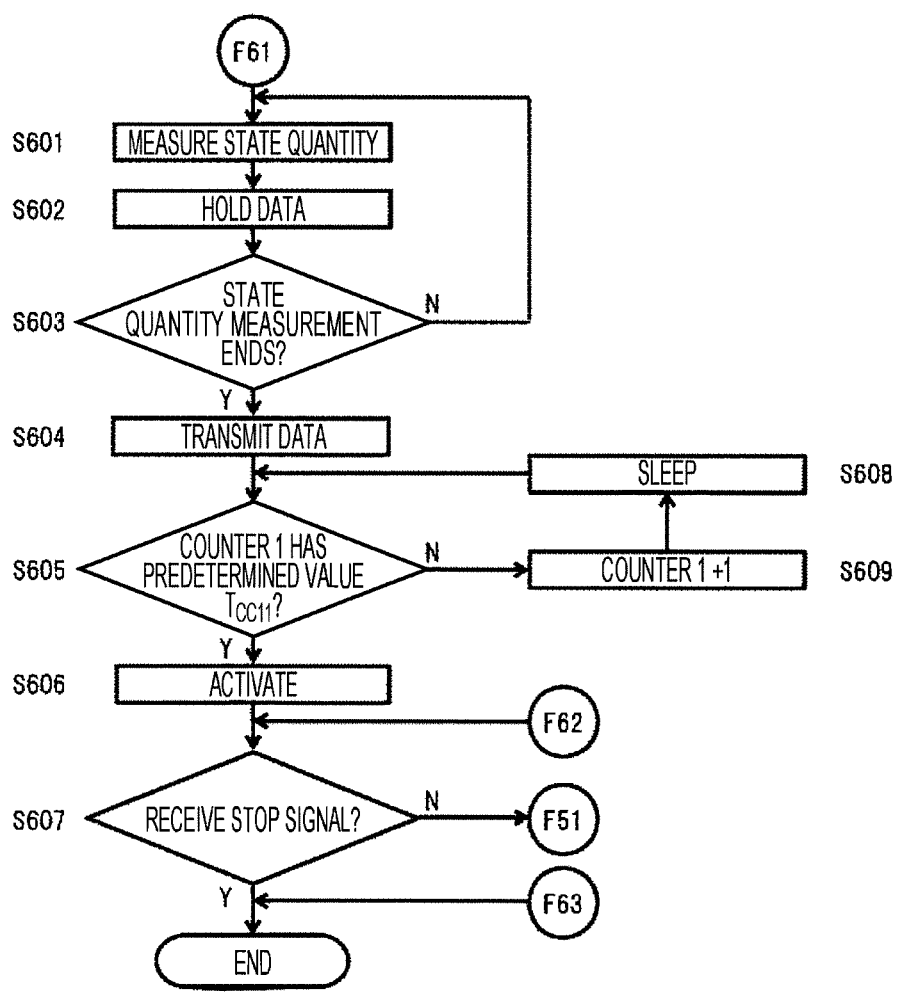
FIG. 6 is flowchart illustrating continuation of the operation of FIG. 5.

After activation of the cell controller 30 or activation of the cell controller 30 is maintained, as shown in S601 to S603 of FIG. 6, the logic circuit 340 measures terminal voltages of the plurality of battery cells 200 as state quantities, selects one of the plurality of battery cells 200, and measures a terminal voltage of the selected battery cell 200. Thereafter, as shown in S602 of FIG. 6, the logic circuit 340 controls the voltage detection circuit 311 and the register 350 to store information (data) related to the measured terminal voltage in the register 350.

Thereafter, as shown in S603 of FIG. 6, it is determined whether the terminal voltages of all the battery cells 200 have been acquired. When it is negatively determined that the terminal voltages of all the battery cells 200 have not been acquired, the operation returns to S601 of FIG. 6, and processes from S601 to S603 of FIG. 6 are repeated. When it is determined that the terminal voltages of all the battery cells 200 have been acquired in S603, data related to the terminal voltages of the battery cells 200 is transmitted from the cell controller 30 to the battery controller in S604.

In S605 of FIG. 6, it is determined whether the count value of the counter 1 is $T_{cc11}$ corresponding to a value set in advance based on transmission of the data related to the terminal voltages of the battery cells 200. When the count value of the counter 1 is not the predetermined value $T_{cc11}$, counting of the counter 1 is started in S609 of FIG. 6. As shown in S608 of FIG. 6, a sleep state is entered until timing of a subsequent readout request from the battery controller. On the other hand, when the count value of the counter 1 is the predetermined value $T_{cc11}$, the cell controller is activated as illustrated in S606. As shown in S607, after activation, the operation of the cell controller ends by receiving a stop signal. When the stop signal may not be received, the cell controller 30 waits for the command signal to be transmitted from the battery controller as shown in S502 of FIG. 5.

——Reception of Data——

After data is transmitted from the cell controller, the battery controller receives the data. The operation proceeds to S305 of FIG. 3, and a reception state (Rx) is entered to receive data related to the terminal voltage of the battery cell 200 transmitted from each cell controller 30 as illustrated in FIG. 12. Further, the data transmitted from each cell controller 30 is received in a time-division manner in a predetermined order. Here, a description is given using a case in which the cell controller 30 transmits data in an order of CC1, CC2, . . . , CCn-1, and Cn as an example.

Counting of the counter 1 in the counter 413 of the microcomputer 410 is started based on reception of data from CC1. Thereafter, as shown in S307 of FIG. 3, it is determined whether a count value is a predetermined value $T_{BC11}$. When the microcomputer 410 determines that the count value is not the predetermined value $T_{BC11}$ in S307 of FIG. 3, the operation returns to S305, and data is received again.

On the other hand, when the microcomputer 410 determines that the count value is the predetermined value $T_{Bc11}$ in S307 of FIG. 3, it is determined whether there is data which has not been received from the cell controller in S308 of FIG. 3. When there is data which has not been received, counting of the counter 2 in the counter 413 of the microcomputer 410 is started in S312. Thereafter, as shown in S313, it is determined whether the count value is the predetermined value $T_{BC21}$. When the microcomputer 410 determines that the count value is not the predetermined value $T_{BC21}$, the counter 1 is reset as shown in S314 and the data is received again. On the other hand, when the microcomputer 410 determines that the count value is the predetermined value $T_{BC21}$, the counters 1 and 2 are reset as shown in S401 of FIG. 4, and the battery controller 40 transmits a command signal related to the continuous reception request (TxB2) to each cell controller 30. As described above, when the battery controller may not continuously receive data from the cell controller a predetermined number of times or more, the battery controller transmits a request (TxB2) reporting that data is continuously received to every CC (CC1 to CCn) at the time of transmitting data to CC1 to CCn in a broadcast manner.

Thereafter, as shown in S403 of FIG. 4, counting of the counter 1 is started based on transmission of a signal command related to the continuous reception request (TxB2). When the counter 1 is equal to a predetermined value $T_{BC12}$, it is determined that there is an abnormality, and the operation proceeds to S310 of FIG. 3. On the other hand, when the count value of the counter 1 is not the predetermined value $T_{BC12}$, counting of the counter 2 is started as shown in S406 in FIG. 4. When a count value of the count 2 is not a predetermined value $T_{Bc22}$ in S407 of FIG. 4, the operation returns to S406 and counting of the counter 2 is started again. On the other hand, when the count value of the counter 2 is the predetermined value $T_{BC22}$, the battery controller transmits a readout request (TxC2) to each cell controller. The counter 2 is reset based on transmission of a signal related to the readout request (TxC2). When the battery controller receives data related to a cell voltage from the cell controller in S410, it is determined whether the count value of the counter 1 is the predetermined value $T_{BC12}$. When the count value of the counter 1 is the predetermined value $T_{BC12}$, the operation returns to S303 of FIG. 3 and the readout request (TxB1) is periodically transmitted in a broadcast manner from CC1 to CCn. When data from the cell controller may not be received in S410, the operation returns to S403.

When reception of data from all the cell controllers is completed in S308 of FIG. 3, it is determined whether a stop signal has been received in step S309. When the stop signal has been received, the stop signal is transmitted in S310, a stop process is performed, and the operation of the battery controller ends. When the stop signal has not been received, the operation returns to S303 of FIG. 3, and a signal related to the readout request (TxB1) is transmitted to each cell controller again.

—Operation when Abnormality is Present in Cell Controller of Battery Management System 3—

Next, a description will be given of an operation when an abnormality is present in the cell controller with reference to FIGS. 7 to 15.

Normally, upon receiving the readout request (TxB1) from the BC, each CC becomes a standby state (sleep state) up to a predetermined timing (timer or counter) set in advance based on the readout request (TxB1), shifts from the sleep state to a transmissible state immediately before the predetermined timing set in advance, and transmits data related to the terminal voltage of the battery cell 200 to BC at a predetermined timing. After transmission, the sleep state is entered until a timing of a subsequent readout request (TxB1) from BC. However, the cell controller may not receive the readout request from the battery controller due to a different surrounding environment, etc. Such a case will be described with reference to FIGS. 7 to 12.

In S502 of FIG. 5, for example, when CC2 may not receive the readout request (TxB1) from BC and may not transmit data related to the terminal voltage of battery cell 200, the operation flow proceeds to S701 of FIG. 7. The count value of the counter 2 is reset as shown in S701 of FIG. 7. Thereafter, as shown in S702, the count value of the counter 1 is reset. When the count value of the counter 1 is the predetermined value $T_{cc11}$, counting of the counter 2 is started again. When the count value of the counter 2 is not the predetermined value $T_{cc21}$ in S706, the operation returns to S702. On the other hand, when the count value of the counter 2 is the predetermined value $T_{cc21}$ in S706, the count value of the counter 1 is reset (S801), and the counter of the counter 1 is started again (S802). In S803 of FIG. 8, CC2 shifts to continuous reception and receives a readout request (TxC2) from the battery controller. As described above, when there is an abnormality in CC2, and CC2 continuously fails to receive the readout request from the battery controller a predetermined number of times or more, CC2 shifts to continuous reception and waits for the readout request (TxB1 or TxC2) from BC (S803).

Figure 9:
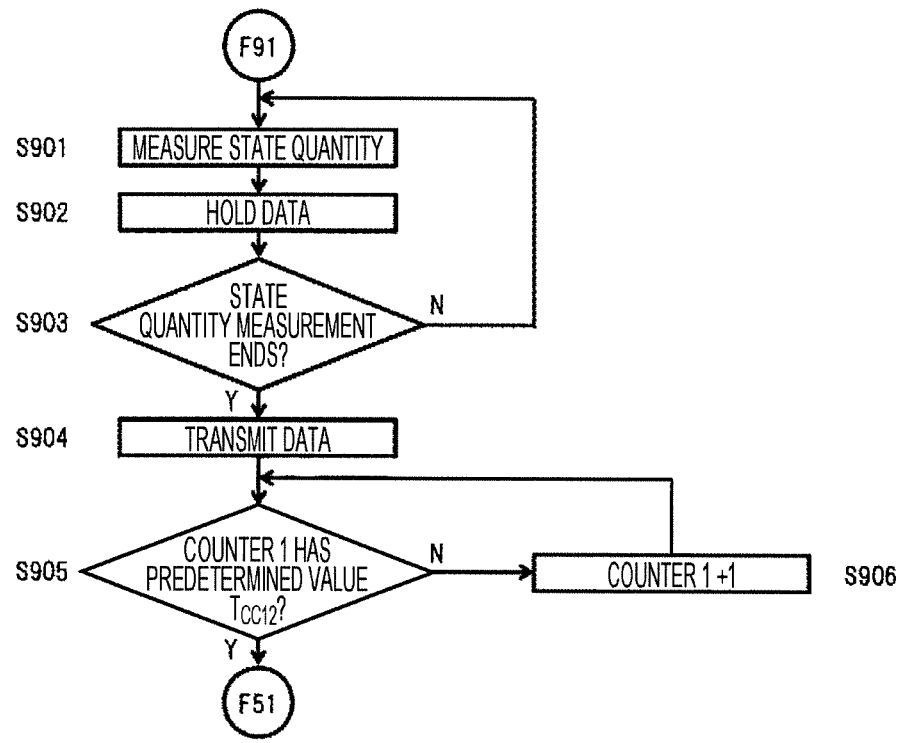
FIG. 9 is flowchart illustrating continuation of the operation of FIG. 8.
Figure 10:
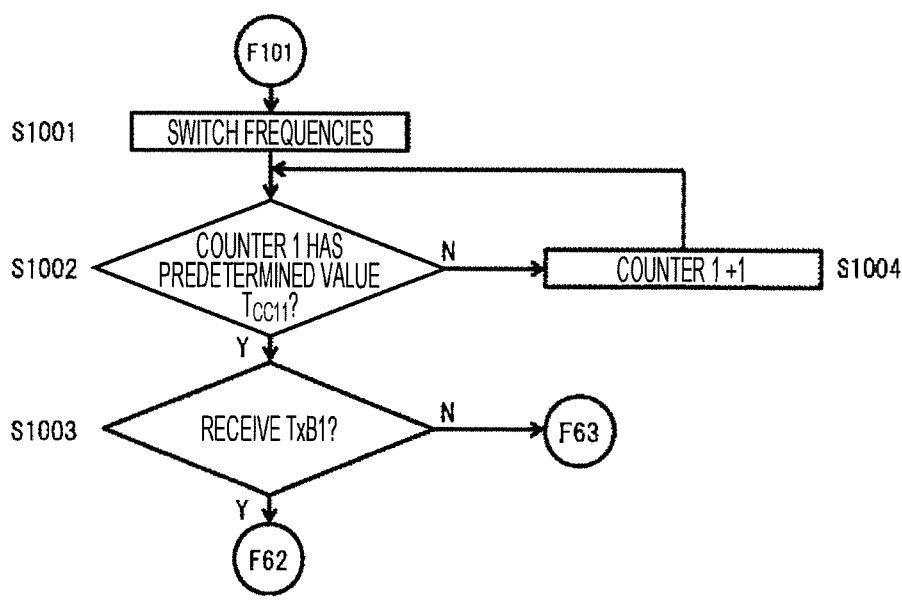
FIG. 10 is flowchart illustrating continuation of the operation of FIG. 9.
Figure 11:
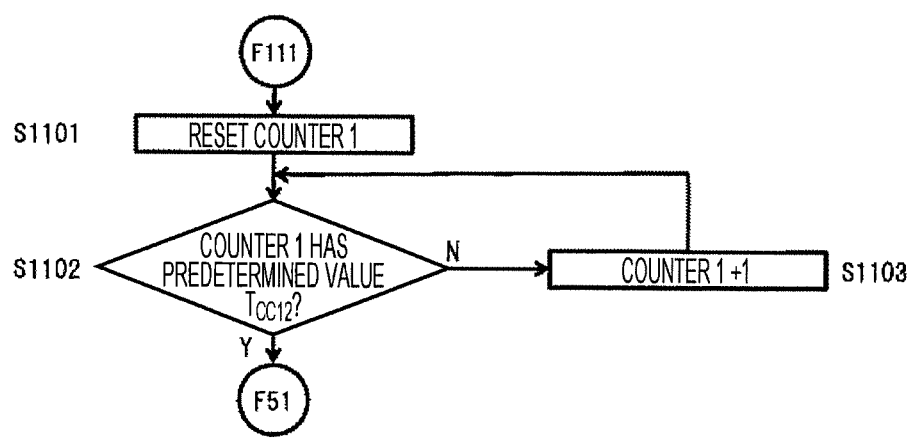
FIG. 11 is flowchart illustrating an operation of the cell controller of FIG. 2, and illustrates an operation of the cell controller in which a communication error does not occur when the communication error occurs.

When CC2 may receive the readout request (TxC2) from the battery controller, the operation proceeds to S901 of FIG. 9. In S901, terminal voltages of the plurality of battery cells 200 are measured as state quantities, one of the plurality of battery cells 200 is selected, and a terminal voltage of the selected battery cell 200 is measured. Thereafter, as shown in S902 of FIG. 9, the voltage detection circuit 311 and the register 350 are controlled to store information (data) related to the measured terminal voltage in the register 350.

Thereafter, as shown in S903 of FIG. 9, it is determined whether the terminal voltages of all the battery cells 200 have been acquired. When it is negatively determined that the terminal voltages have not been acquired, the operation returns to S901 of FIG. 9, and processes from S901 to S903 of FIG. 9 are repeated. When it is determined that the terminal voltages of all the battery cells 200 have been acquired in S903, data related to the terminal voltages of the battery cells 200 is transmitted from CC2 to the battery controller in S904.

In S905 of FIG. 9, it is determined whether the count value of the counter 1 satisfies $T_{cc12}$ which is a preset value based on transmission of the data related to the terminal voltages of the battery cells 200. When the count value of the counter 1 does not satisfy the present $T_{cc12}$, counting of the counter 1 is started in S906 of FIG. 9. On the other hand, when the count value of the counter 1 is the present $T_{cc12}$, the flow proceeds to S502 of FIG. 5. In this way, the operation returns to the operation flow when the cell controller is normal.

With this communication sequence, it is possible to restore communication of CC2 in which a communication error has occurred, and to maintain communication for CC other than CC2 in which no communication error has occurred.

(Embodiment 2)

Figure 16:
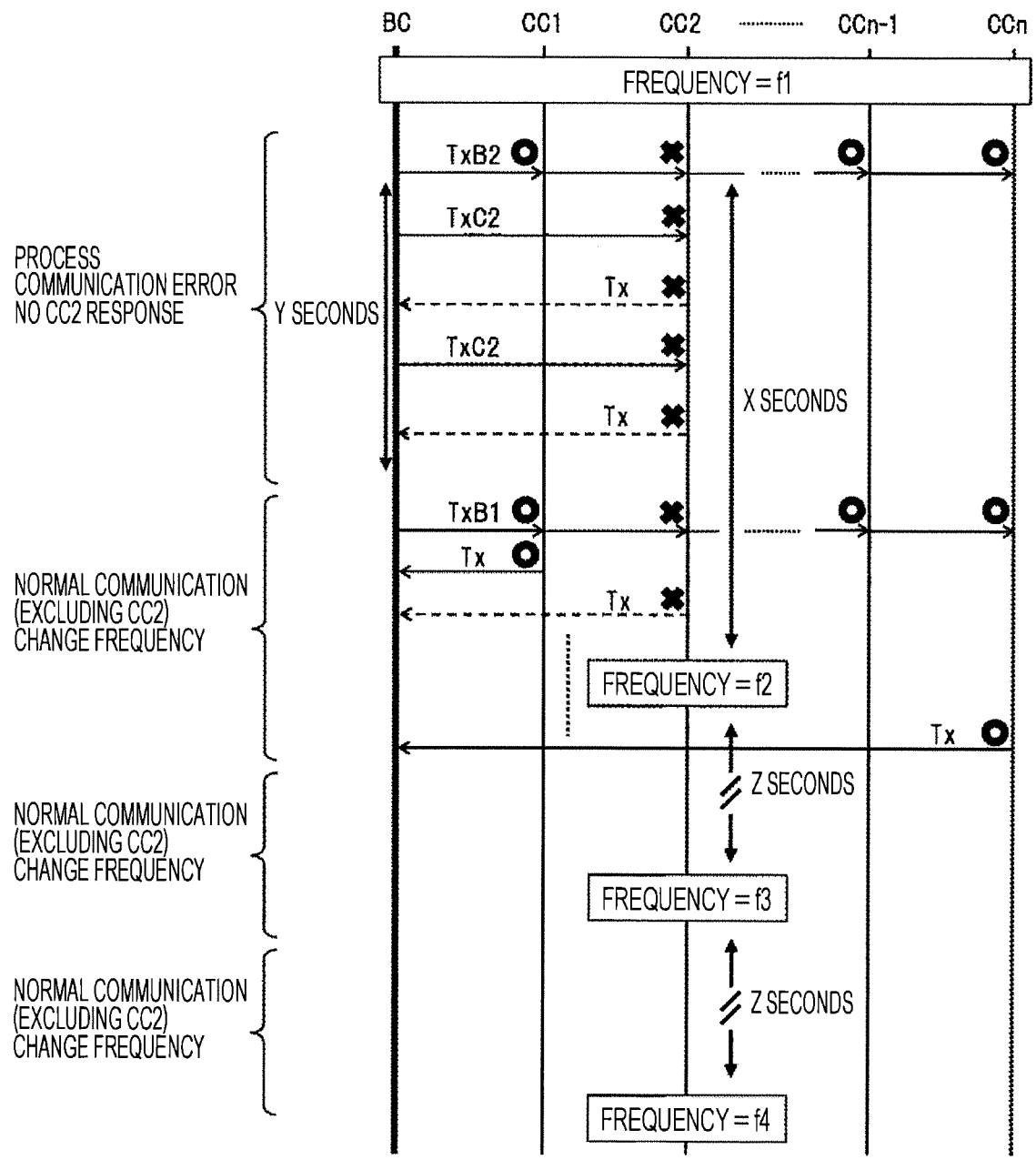
FIG. 16 is a diagram illustrating a communication sequence of a battery management system according to Embodiment 3, and illustrates a communication sequence in which recovery from a communication error by communication error processing fails, recovery from the communication error fails even when a frequency is changed and communication is resumed, and communication is repeatedly resumed several times by changing frequencies again.

Embodiment 1 shows an example in which a recovery process for a communication error succeeds such that when the data related to the terminal voltages of the battery cells 200 may not be continuously received from CC2 a predetermined number of times or more, BC transmits the request (TxB2) reporting that data is continuously received to every CC (CC1 to CCn) at the time of transmitting data to CC1 to CCn in a broadcast manner, and then transmits the readout request (TxC2) to CC2 in which a communication error has occurred once or more, and the data related to the terminal voltages of the battery cells 200 from CC2 is returned. In Embodiment 2, a description will be given of processes of BC and CC2 when the data related to the terminal voltages of the battery cells 200 from CC2 is not returned with reference to FIG. 14 and FIG. 16. FIG. 14 is a communication timing chart of a power storage management system according to Embodiment 2, and FIG. 16 is a communication sequence of the power storage management system according to Embodiment 2. In FIG. 14, TxB1 denotes a data readout request from BC to each CC, Tx denotes a state of data transmission from CC to BC, TxB2 denotes a continuous reception request from BC to each CC, CRx denotes a continuous reception state, TxC2 denotes a data readout request from BC to CC2 (communication error CC), S denotes a sleep (low power consumption standby) state, and Rx denotes a reception state. In FIG. 16, 0 indicates reception or transmission success, and X indicates reception or transmission failure.

—Operation when CC2 May Not Receive Signal within Predetermined Time—

Figure 8:
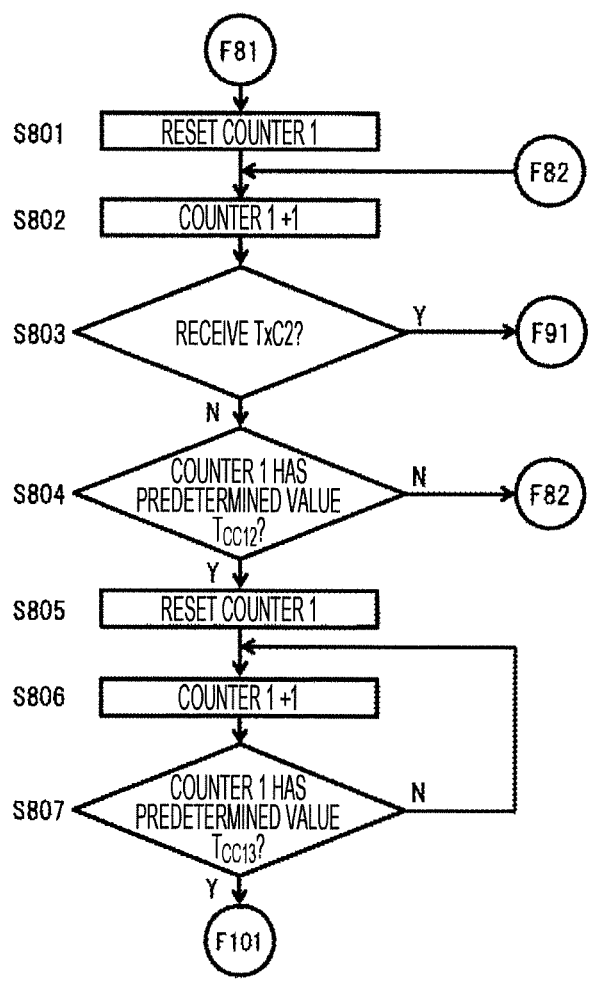
FIG. 8 is flowchart illustrating continuation of the operation of FIG. 7.

When CC2 may not receive the readout request (TxC2) from the battery controller in S803 of FIG. 8, it is determined whether the count value of the counter 1 is a predetermined value Tcc12 in S804. When the count value of the counter 1 is not Tcc12, the operation returns to S802 of FIG. 8. On the other hand, when the count value of the counter 1 is Tcc12, the count value of the counter 1 is reset (S805), and counting of the counter 1 is started (S806). Thereafter, when the count value of the counter 1 is not a predetermined value Tcc13, the operation returns to S806, and counting of the counter 1 is started again. When the count value of the counter 1 is the predetermined value Tcc13, a current frequency (f1) is switched to a predetermined frequency (f2) as shown in S1001 of FIG. 10. Thereafter, as shown in S1002, it is determined whether the count value of the counter 1 is a predetermined value Tcc11. When the count value of the counter 1 is not the predetermined value Tcc11, counting of the counter 1 is started again (S1004). On the other hand, when the count value of the counter 1 is the predetermined value Tcc11, the readout request (TxB1) from the battery controller is received (S1003). When the readout request (TxB1) is received, the operation flow proceeds to S607 of FIG. 6. When the readout request (TxB1) is not received, the cell controller terminates the operation.

As described above, in FIG. 14, when CC2 may not receive the readout request (TxB1) from BC, CC2 shifts to continuous reception, and then waits for the readout request (TxB1 or TxC2) from BC. When the readout request (TxB1 or TxC2) may not be received even after waiting for a predetermined time (X seconds), the current frequency (f1) is switched to the predetermined frequency (f2) for continuous reception to wait for the readout request (TxB1 or TxC2) from BC.

—Operation when BC May Not Receive Signal within Predetermined Time—

Meanwhile, in communication error processing, BC transmits the readout request (TxC2) to CC2 once or more, and waits for a response (S408 of FIG. 4). When data may not be received from CC2 in S410 of FIG. 4, the step proceeds to S403 of FIG. 4.

As described above, when the data related to the terminal voltages of the battery cells 200 from CC2 is not arrived after waiting for a predetermined time (Y seconds), BC reports that the current frequency (f1) is switched to the predetermined frequency (f2) from a subsequent readout request (TxB1) by broadcast transmission of the readout request (TxB1). Thereafter, BC transmits the readout request (TxB1) in a broadcast manner at frequency 2.

(Embodiment 3)

Embodiment 2 shows an example in which communication is recovered by switching CC2 from the frequency f1 to the frequency f2. In Embodiment 3, a description will be given of an operation flow when the readout request may not be received from BC even after continuous reception for a predetermined time at the frequency f2. FIG. 16 illustrates an operation sequence at the time of communication error processing in a battery management system according to the embodiment.

As illustrated in FIG. 16, when the readout request (TxB1 or TxC2) from BC may not be received as a result of continuous reception for a predetermined time (Z seconds) at the frequency f2, continuous reception is performed by switching to a predetermined frequency f3.

Figure 17:
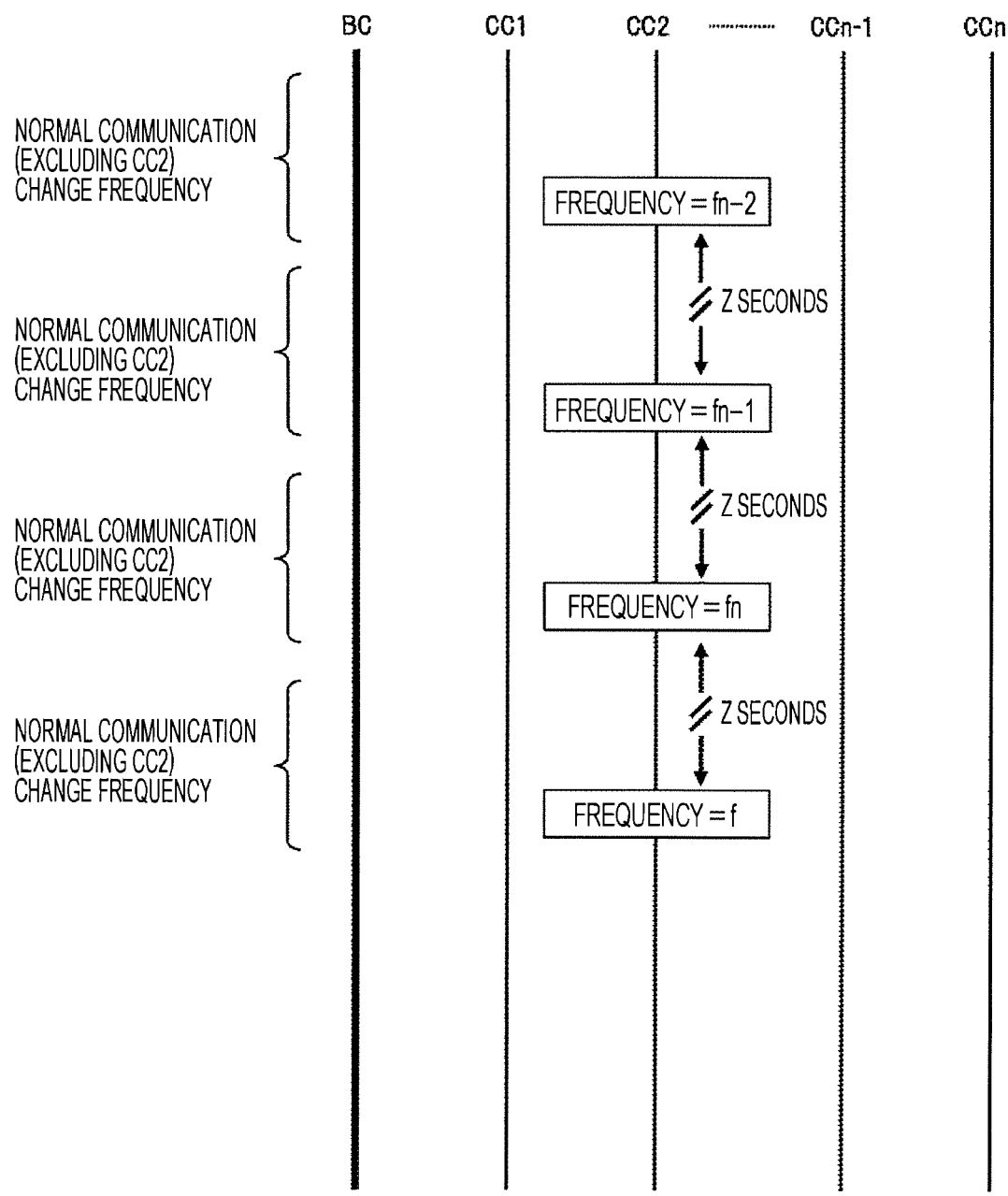
FIG. 17 is a diagram illustrating a communication sequence of the battery management system according to Embodiment 3, and illustrates a communication sequence in which recovery from a communication error by communication error processing fails, recovery from the communication error fails even when a frequency is changed and communication is resumed, and communication is repeatedly resumed several times by changing frequencies again.

In addition, when the readout request (TxB1 or TxC2) from BC may not be received for the predetermined time (Z seconds) at the frequency f3, switching to a predetermined frequency f4 is repeated. FIG. 17 illustrates an operation sequence at the time of communication error processing in the battery management system. When the readout request (TxB1 or TxC2) from BC may not be received after continuous reception by switching frequencies up to a predetermined frequency fn, the readout request (TxB1 or TxC2) from BC is waited for by continuous reception or intermittent reception (a reception state and a standby state are repeated) at a preset frequency.

(Embodiment 4)

Figure 18:
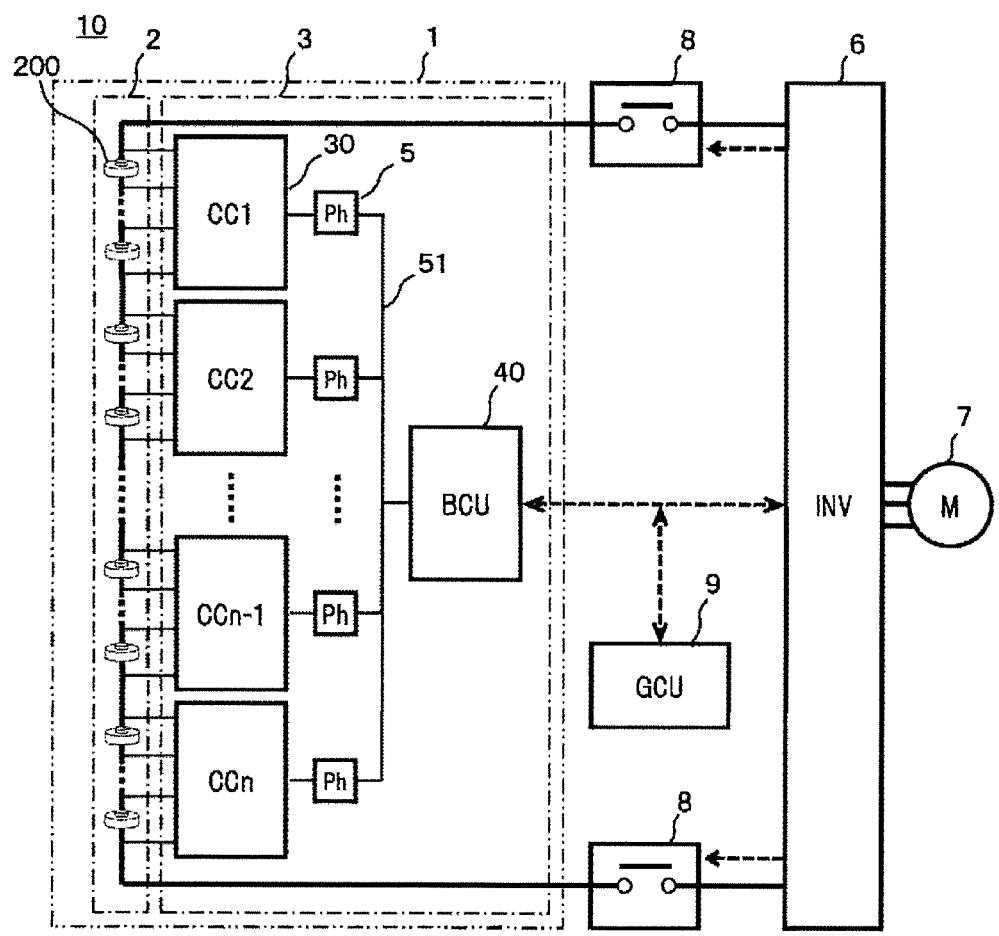
FIG. 18 is a block diagram illustrating an electrical connection configuration between a battery system including a battery management system according to Embodiment 4 and a load.

Embodiment 4 is an example in which a wired scheme is adopted for communication between a plurality of cell controllers 30 and a battery controller 40. FIG. 18 is a block diagram illustrating a connection configuration between a battery management system according to Embodiment 4 and a load. The plurality of cell controllers 30 and the battery controller are connected by a wire 51, and a photo coupler 5 is provided between the plurality of cell controllers 30 and the battery controller 40. The photo coupler converts an electric signal into light on the inside and converts light back into the electric signal again, so that the signal can be transmitted while being electrically insulated.

(Embodiment 5)

Figure 19:
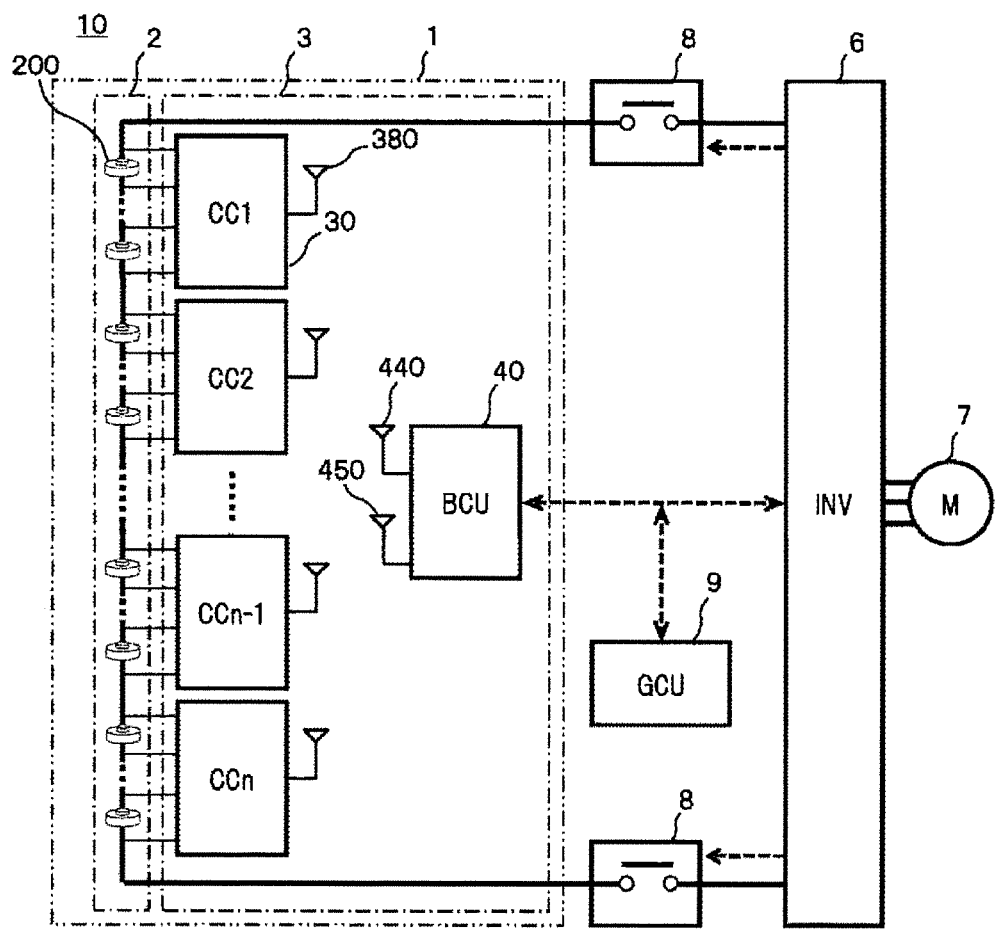
FIG. 19 is a block diagram illustrating an electrical connection configuration between a battery system including a battery management system according to Embodiment 5 and a load.

Embodiment 5 corresponds to an example in which a battery controller has two channels, and a wireless scheme is adopted for communication between a plurality of cell controllers 30 and a battery controller 40. FIG. 19 is a block diagram illustrating a connection configuration between a battery system according to Embodiment 5 and a load. Antennas 440 and 450 for transmitted and receiving a radio wave to and from each of the plurality of cell controllers 30 are provided in the battery controller 40. The antennas 440 and 450 are signal medium converters that convert a transmitted wave output from a radio circuit 430 into a radio wave to transmit the radio wave to the cell controllers 30, and receive a radio wave output from each of the cell controllers 30 to convert the radio wave into a received wave input to the radio circuit 430 and input the wave to the radio circuit 430.

(Embodiment 6)

Figure 20:
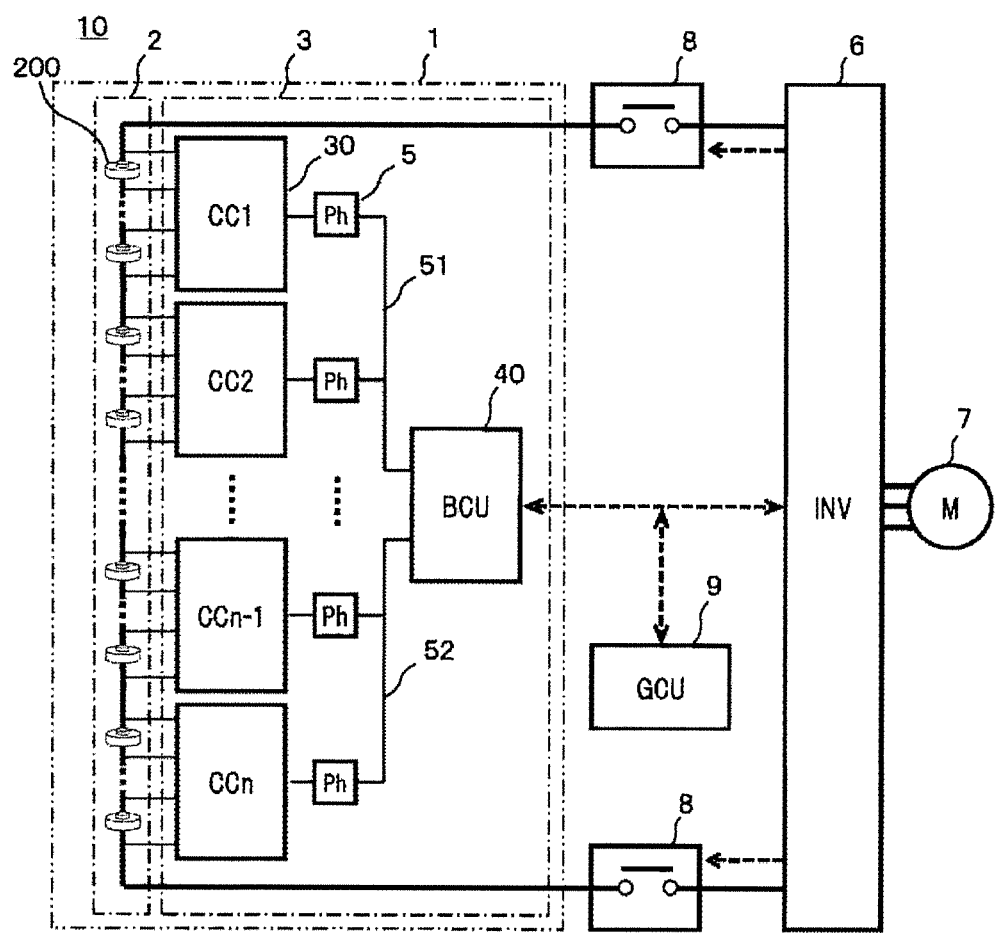
FIG. 20 is a block diagram illustrating an electrical connection configuration between a battery system including a battery management system according to Embodiment 6 and a load.

Embodiment 6 corresponds to an example in which a battery controller has two channels, and a wired scheme is adopted for communication between a plurality of cell controllers 30 and a battery controller 40. FIG. 20 is a block diagram illustrating a connection configuration between a battery system according to Embodiment 6 and a load. The battery controller 40 and the plurality of cell controllers 30 are connected by wires 51 and 52, and a photo coupler 5 is provided between the plurality of cell controllers 30 and the battery controller.

REFERENCE SIGNS LIST 10 one or plurality of battery cell groups
20 one or plurality of measurement units (sensors) for measuring state of battery
30 processing unit for acquiring and processing state information of battery
31 power supply circuit
32 detection circuit (A/D converter) for detecting state of battery cell
33 processing circuit (CPU) for diagnosing state of battery cell
34 storage device (memory)
40 radio circuit
50 antenna
60 processing unit for acquiring and processing state information of battery
61 power supply circuit
62 detection circuit (A/D converter) for detecting state of battery cell
63 processing circuit (CPU) for diagnosing state of battery cell
64 storage device (memory)

100 battery cell management device
200 assembled battery management device
210 radio circuit
220 processing circuit (CPU)
230 power supply circuit including battery
240 storage device (memory)
250 antenna

The invention claimed is:

1. A power storage management system, comprising:
a first plurality of information acquisition devices that acquire states of a plurality of power storage cells; and
an information collection device that communicates with the first plurality of information acquisition devices in a time-division manner, and collects state information corresponding to information related to the states of the plurality of power storage cells acquired by the first plurality of respective information acquisition devices,
wherein the first plurality of respective information acquisition devices is in a first state in which communication with the information collection device is allowed during a first period in which the first plurality of information acquisition devices communicate with the information collection device, and is in a second state in which the first state, in which communication with the information collection device is allowed, is canceled during a second period in which a second plurality of information acquisition devices communicate with the information collection device in a relation of n to 1 (n is a positive natural number indicating the number of communication channels of the information collection device), and
a process to resolve a communication error is executed by putting all the first plurality of information acquisition devices in the first state in which communication with the information collection device is allowed at all times when the communication error, where transmission, reception, or both transmission and reception of a signal is not allowed, occurs between one or more of the first plurality of information acquisition devices and the information collection device.

2. The power storage management system according to claim 1,
wherein the information collection device periodically transmits a timing signal serving as reference timing of time division communication to the first plurality of information acquisition devices, and
after receiving the timing signal transmitted from the information management device, each of the first plurality of information acquisition devices transmits a signal related to the state information to the information collection device based on individual timing assigned differently for each of the first plurality of information acquisition devices.

3. The power storage management system according to claim 2, wherein the information collection device determines that the communication error has occurred when a signal related to state information from an information acquisition device corresponding to each individual timing continuously fails to be received a predetermined number of times or more at each individual timing.

4. The power storage management system according to claim 3, wherein when the information collection device determines that the communication error has occurred, the information collection device transmits a request signal for allowing communication with the information collection device at all times to the first plurality of information acquisition devices, and allows the first plurality of information acquisition devices in which the communication error has not occurred to communicate with the information collection device at all times.

5. The power storage management system according to claim 4, wherein each of the first plurality of information acquisition devices determines that the communication error has occurred in each of the first plurality of information acquisition devices when a signal related to state information of a corresponding power storage cell is not allowed to be transmitted to the information collection device or a signal from the information collection device is not allowed to be received continuously a predetermined number of times or more at corresponding individual timing.

6. The power storage management system according to claim 5, wherein when each of the first plurality of information acquisition devices determines that the communication error has occurred in each of the first plurality of information acquisition devices, each of the first plurality of information acquisition devices puts each of the first plurality of information acquisition devices in the first state in which communication with the information collection device is allowed at all times.

7. The power storage management system according to claim 6, wherein communication processing for resolving the communication error is started when all the first plurality of information acquisition devices is in the first state in which communication with the information collection device is allowed at all times.

8. The power storage management system according to claim 7, wherein the communication processing for resolving the communication error is processing in which the information collection device transmits a request signal once or more to an information acquisition device in which the communication error has occurred so that the information acquisition device in which the communication error has occurred transmits state information of a power storage cell acquired in the information acquisition device.

9. The power storage management system according to claim 8, wherein the information collection device changes a frequency used for communication with the first plurality of information acquisition devices to a predetermined frequency when the communication error fails to be resolved even after performing the communication processing for resolving the communication error for a predetermined time.

10. The power storage management system according to claim 8, wherein the information acquisition device in which the communication error has occurred continuously receives signals from the information collection device by changing a frequency used for communication with the information collection device to a predetermined frequency when signals from the information collection device fail to be received for a predetermined time or more in a state in which the signals from the information collection device are continuously received.

11. The power storage management system according to claim 9, wherein the information acquisition device in which the communication error has occurred continuously receives signals from the information collection device by changing a frequency used for communication with the information collection device to the same frequency as the predetermined frequency when signals from the information collection device fail to be received for a predetermined time or more in a state in which the signals from the information collection device are continuously received.

12. The power storage management system according to claim 1, wherein the plurality of power storage cells corresponds to devices provided to correspond to each power storage cell group having one or several power storage cells, and includes a plurality of first control devices including a power supply unit that generates an operation voltage using a corresponding capacitor group as a power supply, a measurement unit that measures a state quantity of each of one or a plurality of capacitors included in the corresponding capacitor group, and a communication unit that transmits and receives a signal, the first control devices entering an operation state when the operation voltage is supplied from the power supply unit to the measurement unit and the communication unit and entering an idle state when supply of the operation voltage from the power supply unit to the measurement unit and the communication unit is suspended, and a second control device that includes a communication unit that transmits and receives a signal, and communicates with each of the plurality of first control devices in a time-division manner, the second control device puts all the plurality of first control devices in the operation state and transmits a request signal for continuing the operation state of all the plurality of first control devices to all the plurality of first control devices when an error occurs in communication with one or a plurality of the plurality of first control devices, and the plurality of first control devices is set to be allowed to receive the request signal, and transmits a signal related to the state information to the information collection device based on individual timing assigned differently for each of the plurality of first control devices.

* * * * *